(12) United States Patent
Kamachi et al.

(10) Patent No.: US 8,069,576 B2
(45) Date of Patent: Dec. 6, 2011

(54) VEHICLE WHEEL ALIGNMENT MEASURING METHOD AND APPARATUS

(75) Inventors: Hideari Kamachi, Tochigi (JP); Kiyonobu Hara, Tochigi (JP); Yushi Aoki, Tochigi (JP); Kenichiro Ono, Tochigi (JP); Hiroshi Saito, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 424 days.

(21) Appl. No.: 12/404,883

(22) Filed: Mar. 16, 2009

(65) Prior Publication Data

US 2010/0274514 A1 Oct. 28, 2010

(30) Foreign Application Priority Data

| Mar. 17, 2008 | (JP) | ................................ | 2008-068323 |
| Mar. 27, 2008 | (JP) | ................................ | 2008-083513 |
| Mar. 27, 2008 | (JP) | ................................ | 2008-083514 |
| Mar. 27, 2008 | (JP) | ................................ | 2008-083515 |
| Mar. 27, 2008 | (JP) | ................................ | 2008-083516 |
| Mar. 27, 2008 | (JP) | ................................ | 2008-083517 |
| Mar. 28, 2008 | (JP) | ................................ | 2008-086018 |

(51) Int. Cl.
*G01B 5/255* (2006.01)

(52) U.S. Cl. ....................................... 33/203.15; 33/203

(58) Field of Classification Search .................... 33/203, 33/12, 203.15, 203.18, 288

See application file for complete search history.

(56) References Cited

U.S. PATENT DOCUMENTS

| 2,812,583 | A | * | 11/1957 | Herzegh | ............................. | 33/203 |
| 3,181,248 | A | * | 5/1965 | Manlove | ..................... | 33/203.18 |
| 3,808,695 | A | * | 5/1974 | LaMoreux | ....................... | 33/203 |
| 4,106,208 | A | * | 8/1978 | Hunter | ....................... | 33/203.18 |
| 4,856,199 | A | * | 8/1989 | Merrill et al. | ............... | 33/203.15 |
| 5,243,766 | A | * | 9/1993 | Marley et al. | ............... | 33/203.18 |
| 6,453,567 | B1 | * | 9/2002 | Naruse | ............................ | 33/203 |
| 7,100,290 | B2 | * | 9/2006 | Hara et al. | .................. | 33/203.12 |
| 2009/0000133 | A1 | * | 1/2009 | Hara | ............................ | 33/203.15 |
| 2009/0126208 | A1 | * | 5/2009 | Suita et al. | .................. | 33/203.12 |

FOREIGN PATENT DOCUMENTS

| JP | 02-309210 A | 12/1990 |
| JP | 04-313012 A | 11/1992 |
| JP | 10-508942 A | 9/1998 |
| JP | 2000-074632 A | 3/2000 |
| JP | 2001-099643 A | 4/2001 |
| JP | 2004-012195 A | 1/2004 |
| WO | WO 96/15434 A1 | 5/1996 |

* cited by examiner

*Primary Examiner* — G. Bradley Bennett
(74) *Attorney, Agent, or Firm* — Arent Fox LLP

(57) ABSTRACT

A vehicle wheel alignment measuring method and apparatus capable of measuring wheel alignment of a vehicle body with high accuracy without wheels mounted in an assembly line. A dummy wheel (10) is mounted on a wheel mounting portion (6) on which a wheel is not mounted. Subsequently, with a vehicle body supported, a wheel mounting portion elevating means (8) elevates the wheel mounting portion (6) via the dummy wheel (10). Thereafter, an alignment measuring means (9) measures wheel alignment for the wheel mounting portion (6) on which the dummy wheel (10) is mounted.

19 Claims, 17 Drawing Sheets

VEHICLE WHEEL ALIGNMENT MEASURING METHOD AND APPARATUS

BACKGROUND OF THE INVENTION

1. Field of the Invention

The present invention relates to a method and apparatus for measuring the wheel alignment of a vehicle.

2. Description of the Related Art

In a vehicle, a wheel is provided with a camber angle to secure steerage during driving and the wheel is provided with a toe angle to prevent a decrease in straight-running stability caused by the provision of the camber angle. Further, in order to fix the wheel alignment so as to achieve good driving stability, it is necessary to measure the angle and position of each wheel with high accuracy. Wheel alignment measurement is generally performed for a finished vehicle with wheels mounted thereon. In this case, however, for example, the wheel alignment measurement is performed based on the position and attitude of the side wall of each wheel (tire and road wheel). This could lead to an error in the measurement result according to elastic deformation of the tire, a road wheel mounting state, and the like, and the measurement result is useless in fixing the wheel alignment with accuracy.

On the other hand, conventionally, the vehicle alignment is measured via wheel mounting portions without the wheels mounted in an assembly line for assembling a vehicle body in order to improve the productivity of the vehicle. More specifically, in the vehicle body assembly line, steering gears and suspensions are installed and thereafter a load equivalent to the vehicle weight is applied to the wheel mounting portions in a state where the wheel mounting portions without the wheels mounted thereon are elevated relatively to the vehicle body, and then the position and attitude of the wheel mounting portions are detected to measure the wheel alignment. Thereby, the position and attitude of the wheel mounting portions are detected without the wheels, and therefore it is possible to obtain a measurement result unaffected by the elastic deformation and mounting state of the wheels.

Since, however, the wheel alignment measurement performed for the wheel mounting portions on which wheels are not mounted differs in the ground contact state or load-applied state from a measurement for the wheel mounting portions on which the wheels are mounted, it is insufficient to obtain high measurement accuracy.

SUMMARY OF THE INVENTION

In view of the above problem, it is an object of the present invention to provide a vehicle wheel alignment measuring method and apparatus capable of measuring wheel alignment without wheels mounted in an assembly line for assembling a vehicle body and capable of obtaining a highly accurate measurement result of wheel alignment.

According to an aspect of the present invention, there is provided a vehicle wheel alignment measuring method comprising: a vehicle body support step of causing a vehicle body support means to support a vehicle body with wheel mounting portions free to move up and down, each of the wheel mounting portions being provided on an axle including a vehicle suspension; a wheel mounting portion elevating step of elevating the wheel mounting portion without a wheel mounted thereon; and a measurement step of measuring wheel alignment based on the position and attitude at predetermined measurement points preset on the wheel mounting portion elevated in the wheel mounting portion elevating step, wherein: the wheel mounting portion elevating step is preceded by a dummy wheel attachment step of mounting a dummy wheel on the wheel mounting portion to simulate a situation where a wheel is mounted on the wheel mounting portion with the measurement points on the wheel mounting portion exposed; and the wheel mounting portion elevating step includes elevating the wheel mounting portion via the dummy wheel and the measurement step includes performing the measurement at the measurement points exposed from the dummy wheel.

According to the measuring method of the present invention, with the vehicle body supported by the vehicle supporting means in the vehicle body support step, the wheel mounting portion without the wheel mounted thereon is elevated in the wheel mounting portion elevating step, and the wheel alignment of the wheel mounting portion is measured in the measurement step. The wheel alignment is measured for the wheel mounting portion without the wheel mounted in the measurement step, which enables the wheel alignment measurement for an unfinished vehicle body in an assembly line for assembling a vehicle body. The measurement points are preset on the wheel mounting portion and in the measurement step the measurement result of the wheel alignment is obtained from the position and attitude at the measurement points. The measurement points may be a part of the components constituting the wheel mounting portion such as, for example, a side surface of a braking device. Further, the dummy wheel in the present invention simulates a wheel, and therefore it is assumed that the dummy wheel has a shape that is adaptable to the wheel offset dimensions of the wheel mounting portion of the vehicle body to be measured and causes the power point of an axial load applied to an axle of the wheel mounting portion to coincide with the power point obtained in the wheel actually mounted on the wheel mounting portion.

Still further, in the present invention, the measurement step is performed with the dummy wheel mounted on the wheel mounting portion in the dummy wheel attachment step. Since the dummy wheel is used to simulate the wheel mounted on the wheel mounting portion, the dummy wheel is able to form a ground contact state and a load-applied state to the wheel mounting portion equivalent to the case where the wheel is mounted on the wheel mounting portion, thereby remarkably improving the measurement accuracy of the wheel alignment. Moreover, the dummy wheel is mounted on the wheel mounting portion with the measurement points on the wheel mounting portion exposed, and therefore the measurement of the wheel alignment in the measurement step is performed for the wheel mounting portion. This enables the achievement of a highly accurate measurement result from the position and attitude of the wheel mounting portion without the wheel mounted by reproducing a state where the wheel is actually mounted.

Further, in the wheel mounting portion elevating step of the method according to the present invention, the vehicle body is detached from the vehicle body support means via the dummy wheels, and the measurement step includes a static alignment measurement step of measuring wheel alignment in a stationary state with a vehicle weight received by the dummy wheels. This allows the dummy wheels to receive the vehicle weight and enables the static alignment measurement of the wheel mounting portions in the same state as in the case where the wheels are mounted on the wheel mounting portions.

Still further, in the vehicle body support step of the method according to the present invention, the vehicle body support means caused to support the vehicle body so as to disable elevation thereof. The wheel mounting portion elevating step includes a load measurement step of measuring a load of the wheel mounting portion while elevating the wheel mounting portion relatively to the vehicle body via the dummy wheel and an elevation stop step of stopping the elevation of the wheel mounting portion at the timing that the load of the wheel mounting portion measured in the load measurement step coincides with a preset load, and the measurement step includes a static alignment measurement step of measuring wheel alignment in a stationary state with the vehicle weight received by the dummy wheel after the stop of the elevation in the elevation stop step.

In this instance, for example, a load of the wheel mounting portion in the ground contact state of a finished vehicle is preset as the load applied at the time of stopping the elevation in the elevation stop step (the wheel is mounted on the wheel mounting portion in the finished vehicle, and therefore the preset load is assumed to be a weight obtained by subtracting the weight of each wheel and mounting nut for mounting the wheel on the wheel mounting portion from the value of the wheel mounting portion of the finished vehicle). Thereby, the vehicle weight equivalent to the weight of the finished vehicle is applied to the dummy wheels whose elevation is stopped, thereby enabling the measurement of static alignment of each wheel mounting portion in the same state as in the vehicle where the wheels are mounted on the wheel mounting portions.

Moreover, in the vehicle body support step of the method according to the present invention, the vehicle body support means is caused to support the vehicle body so as to disable elevation thereof. In the wheel mounting portion elevating step, the wheel mounting portion is elevated relatively to the vehicle body via the dummy wheel, and the measurement step includes a dynamic alignment measurement step of measuring wheel alignment in the midst of elevating the wheel mounting portion relatively to the vehicle body via the dummy wheel in the wheel mounting portion elevating step.

In this instance, in the dynamic alignment measurement step, a change in the position of the wheel mounting portion and a change in the wheel alignment are measured in the elevation range of the wheel mounting portion in the wheel mounting portion elevating step, thereby obtaining a change curve of an attitude angle (a toe angle or a camber angle) with reference to the vehicle height set at the time of vehicle body design.

Further, in the method according to the present invention, the wheel mounting portion has a brake disk installed on a hub to which the wheel is to be connected, the dummy wheel is connected to the hub of the wheel mounting portion to expose a plurality of points on a disk surface of the brake disk as the measurement points, and the measurement step includes performing the measurement via the disk surface of the brake disk exposed from the dummy wheel.

The brake disk is installed on the wheel mounting portion with high accuracy so that the disk surface of the brake disk is perpendicular to the axle and the disk surface is flat all over the circumference. The setting of the measurement points on the disk surface of the brake disk enables extremely accurate wheel alignment measurement with high measurement accuracy, for example, in comparison with a case where measurement is performed with the measurement points on the side wall of the wheel (tire and road wheel).

Further, in the vehicle body support step of the method according to the present invention, the vehicle body support means is caused to support the vehicle body so as to disable elevation thereof. The wheel mounting portion elevating step includes a first reference setting step of setting a predetermined position in a range where the wheel mounting portion is able to move up and down as a temporary vehicle height reference for the vehicle body supported in the vehicle body support step to elevate the wheel mounting portion over a predetermined range from below to above the temporary vehicle height reference, and the measurement step includes: a first measurement step of measuring a change in a toe angle and a change in a camber angle of the wheel mounting portion over the elevation range of the wheel mounting portion in the wheel mounting portion elevating step; a change curve forming step of forming a toe angle change curve which represents the relationship between a change in the position and a change in the toe angle of the wheel mounting portion based on the temporary vehicle height reference set in the first reference setting step and forming a camber angle change curve which represents a relationship between a change in the position and a change in the camber angle of the wheel mounting portion based on the temporary vehicle height reference on the basis of the measurement result of the first measurement step; a second reference setting step of releasing the rigid support of the vehicle body by the vehicle body support means to make the vehicle body supported by the wheel mounting portion after the change curve forming step and setting the height position of the wheel mounting portion relative to the vehicle body in the state as an actual vehicle height reference; a second measurement step of measuring the camber angle of the wheel mounting portion located in the actual vehicle height reference; and a reference correction step of correcting the reference in the camber angle change curve from the temporary vehicle height reference to the actual vehicle height reference on the basis of the height position of the wheel mounting portion corresponding to the camber angle measured in the second measurement step and correcting the reference in the toe angle change curve from the temporary vehicle height reference to the actual vehicle height reference on the basis of the height position of the wheel mounting portion corresponding to the camber angle measured in the second measurement step.

According to the above, first, the vehicle support means fixedly supports the vehicle body in the vehicle body support step and the temporary vehicle height reference is set for the vehicle mounting portion of the vehicle body in the first reference setting step. The temporary vehicle height reference is the height position of each wheel mounting portion, which is obtained on the assumption that the wheel mounting portions receive the vehicle weight, and is approximate to the height position of the wheel mounting portion at the actual vehicle height where the wheels are in contact with the ground in the finished vehicle (the vehicle body with the wheels mounted on the wheel mounting portions and the wheels in contact with the ground).

Subsequently, the wheel mounting portion is elevated over the predetermined range from below to above the temporary vehicle height reference in the wheel mounting portion elevating step. In this process, the change in the toe angle and the change in the camber angle are measured in the first measurement step. Thereafter, the measurement result is used to form the toe angle change curve which represents the relationship between the change in the position and the change in the toe angle of the wheel mounting portion and the camber angle change curve which represents the relationship between the change in the position and the change in the camber angle of the wheel mounting portion with respect to the temporary vehicle height reference in the change curve forming step.

In this regard, both of the toe angle change curve and the camber angle change curve formed in the change curve forming step are accurate in an amount of change in the height and angle indicated by the curves. On the other hand, the toe angle change curve and the camber angle change curve are based on the temporary vehicle height reference set in the first reference setting step and therefore could have an error with respect to the actual vehicle height reference. Therefore, in the second reference setting step, first, the rigid support of the vehicle body by the vehicle body support means is released and then the wheel mounting portions are elevated via the dummy wheels to make the vehicle body supported by the wheel mounting portions. In this condition, the actual vehicle weight is applied to the wheel mounting portions and therefore the position of the wheel mounting portion corresponds to the actual vehicle height. With that, the actual vehicle height reference is set on the basis of the height position of the wheel mounting portions in this condition.

Subsequently, the camber angle is measured in the second measurement step from the wheel mounting portion in this condition. Specifically, the camber angle in the static state measured in the second measurement step is a camber angle of the wheel mounting portion located in the height position of the actual vehicle height reference.

Thereafter, in the reference correction step, the coordinates of the camber angle measured in the second measurement step on the camber angle charge curve are extracted and the height position of the wheel mounting portion corresponding to the coordinates is considered to be a reference position. Thereby, the reference of the camber angle change curve formed in the change curve forming step is corrected to the actual vehicle height reference. Further, the actual vehicle height reference (the height position of the wheel mounting portion to be a reference) has already been obtained then, and therefore the actual vehicle height reference is used to correct the reference of the toe angle change curve formed in the change curve forming step to the actual vehicle height reference. The camber angle is measured in the second measurement step and the actual vehicle height reference is obtained from the camber angle change curve by using the camber angle in the reference correction step for the following reason. Specifically, the toe angle change curve includes a part in which the change in the toe angle is very small relative to the change in the position of the wheel mounting portion. Therefore, it is sometimes very difficult to identify the position of the wheel mounting portion from the toe angle coordinates on the toe angle change curve. In comparison to this, the change in the camber angle is large relative to the change in the position of the wheel mounting portion in the camber angle change curve and therefore it is easy to identify the position of the wheel mounting portion efficiently and accurately.

The toe angle change curve and the camber angle change curve are able to be formed very accurately as described above, thereby allowing the fixing of wheel alignment with high accuracy on the basis of the measured change in the toe angle and change in the camber angle (namely dynamic wheel alignment).

In this state, preferably the wheel mounting portion elevating step and the first measurement step are performed in an adapting step for achieving a smooth operation of the suspension provided in an assembly line for assembling the vehicle body. In the assembly line of the vehicle body, the adapting step is provided after the mounting of the suspension. In the adapting step, the wheel mounting portion is forcibly moved up and down for the purpose of achieving a smooth operation of the suspension. Therefore, the wheel mounting portion elevating step and the first measurement step are performed in this process to enable the measurement of the change in the toe angle and the change in the camber angle of the wheel mounting portion simultaneously with the adapting step. Therefore, this method is capable of measuring the change in the toe angle and the change in the camber angle very efficiently in the assembly line of the vehicle body.

Further, in the method of the present invention, the dummy wheel includes a mounting member to be mounted on an axle end on the wheel mounting portion and a connection frame to be attachably and detachably connected to the mounting member, and the dummy wheel attachment step includes: a member mounting step of mounting the mounting member on each axle end on four wheel mounting portions; a connection step of locating the respective wheel mounting portions with the mounting members mounted thereon above support plates provided movably in an anteroposterior direction and in a left-right direction, assuming that a vehicle length direction is the anteroposterior direction and a vehicle width direction is the left-right direction, and connecting the connection frame connectable to the mounting member provided on each support plate to the mounting member mounted on each wheel mounting portion; a moving distance measurement step of measuring a moving distance of each connection frame in the anteroposterior direction and in the left-right direction from a preset reference position for each connection frame via the support plate after each connection frame is connected to the mounting member in the connection step; and an offset and setback detecting step of detecting an offset, which is an amount of displacement in the middle position between the front and rear suspensions, and a setback, which is a left-and-right wheel base difference, from the coordinates of each wheel mounting portion based on the moving distance of each connection frame measured in the moving distance measurement step.

Since the connection frame is connected to the mounting member in the connection step and the offset and the setback are detected in the offset and setback detecting step on the basis of the moving distance of each connection frame, the offset and the setback are able to be easily detected without the wheels mounted on the wheel mounting portions. This preferably enables a high accuracy inspection of the suspensions previous to the alignment measurement in the assembly line of the vehicle body without the wheels mounted on the wheel mounting portions, thereby enabling a smooth and rapid feedback to an installation station of the suspensions in the assembly line.

Moreover, the moving distance of each connection frame measured in the moving distance measurement step is directly measured from each wheel mounting portion due to the connection of the connection frame to the mounting member, and therefore the method is capable of detecting the offset and the setback with very high accuracy, for example, in comparison with a case where a noncontact ultrasonic distance sensor or the like measures the moving distance from the side wall of the tire.

Further, in the method of the present invention, the measurement step is performed by using a measuring means having a displacement amount detecting means, which is enabled to detect a displacement amount at the measurement points of the wheel mounting portion by power supply, and a temperature detecting means, which detects a temperature of the displacement amount detecting means, and the measurement step includes a measuring means warm-up step of performing warm-up previous to performing alignment measurement of the wheel mounting portion from immediately after the start of the power supply to the measuring means until the temperature of the displacement amount detecting means reaches a predetermined temperature, the measuring means warm-up step includes the steps of: securing a wheel mounting portion reproducing member in a fixed position, instead of the wheel mounting portion; obtaining a first displacement amount which is a false displacement amount detected multiple times by the displacement amount detecting means due to an effect of a temperature change for the wheel mounting portion reproducing member and a temperature detected by a temperature detecting means at the time of detecting each first displacement amount; and calculating a rate of change of the first displacement amount associated with the temperature change from each first displacement amount and temperature, and the measurement step includes the step of: calculating a correction value on the basis of the rate of change of the first displacement amount and the temperature detected by the temperature detecting means at the time of detecting a second displacement amount in the case of detecting the second displacement amount for the wheel mounting portion by the displacement amount detecting means by performing the alignment measurement of the wheel mounting portion and further outputting the displacement amount, which is corrected by subtracting the correction value from the second displacement amount, as a correct displacement amount.

According to the above, in case of a decrease in the measurement accuracy of the displacement amount detecting means due to the effect of the power supply or a change in the temperature environment, the displacement amount detected by the displacement amount detecting means is able to be accurately corrected, and therefore the method is capable of performing very accurate alignment measurement. Specifically, in the measuring means warm-up step, the displacement amount detecting means detects the first displacement amount, first. In this condition, the displacement amount detecting means detects a false displacement amount as if the wheel mounting portion reproducing member were displaced though the wheel mounting portion reproducing member is not actually displaced. Therefore, the displacement amount detecting means detects the false displacement amount, which is detected as if the wheel mounting portion reproducing member were displaced though actually not, as the first displacement amount in the temperature rise period of the measuring means warm-up step. The first displacement amount is a value affected by the temperature change of the displacement amount detecting means and therefore the rate of change of the first displacement amount is then calculated from the first displacement amount and the amount of change in the temperature of the displacement amount detecting means detected by the temperature detecting means in response to the first displacement amount.

The displacement amount detecting means is actually able to detect the displacement amount of a work after the temperature of the displacement amount detecting means reaches a predetermined temperature by performing the measuring means warm-up step. In the measurement step after the completion of the measuring means warm-up step, the displacement amount detecting means detects the displacement amount (the second displacement amount) of the wheel mounting portion and the temperature detecting means detects the temperature of the displacement amount detecting means at the time. Thereafter, the displacement amount detecting means obtains the correct displacement amount corrected by subtracting the correction value, which is obtained from the rate of change of the first displacement amount, from the second displacement amount and outputs the correct displacement amount. According to the above, the method is capable of preventing a decrease in the measurement accuracy due to the effect of the temperature change of the displacement amount detecting means so as to detect the displacement amount of the wheel mounting portion with high accuracy and to perform the alignment measurement with high accuracy.

Further, according to another aspect of the present invention, there is provided a wheel alignment measuring apparatus to implement the above method, comprising: a vehicle body support means which supports a vehicle body so as to enable elevation or to disable elevation thereof with wheel mounting portions free to move up and down, each of the wheel mounting portions being provided on an axle of the vehicle; a dummy wheel which is attachably and detachably mounted on the wheel mounting portion with exposed predetermined measurement points previously set on the wheel mounting portion without a wheel mounted thereon to simulate a situation where the wheel is mounted on the wheel mounting portion; a wheel mounting portion elevating means which elevates the wheel mounting portion via the dummy wheel; and a measuring means which measures the wheel alignment on the basis of the position and attitude at the measurement points on the wheel mounting portion elevated by the wheel mounting portion elevating means.

According to the apparatus of the present invention, the measuring means performs the measurement with the dummy wheel mounted on the wheel mounting portion and therefore it is possible to perform the wheel alignment measurement for the wheel mounting portion as if the wheel were mounted on the wheel mounting portion. Therefore, the apparatus is capable of measuring the wheel alignment with high accuracy also in the case where the wheels are not mounted on the wheel mounting portions in the assembly line of the vehicle body.

Further, in the apparatus according to the present invention, in the case where the vehicle body support means supports the vehicle body so as to enable elevation, the elevation of the wheel mounting portions by the wheel mounting portion elevating means detaches the vehicle body upward of the support member, thereby enabling easy static alignment measurement with the vehicle weight applied to the dummy wheels. Moreover, in the case where the vehicle support means supports the vehicle body so as to disable elevation thereof, the wheel mounting portion elevating means elevates the wheel mounting portions relatively to the vehicle body, thereby easily enabling the dynamic alignment measurement in the elevation range.

Further, the dummy wheel in the present invention includes a mounting member to be mounted on an axle end on the wheel mounting portion, a connection frame to be attachably and detachably connected to the mounting member, and a connecting means which is provided in the connection frame to connect the connection frame to the mounting member, and the connection frame includes an open portion which exposes the measurement points on the wheel mounting portion in the state where the connection frame is connected to the mounting member mounted on the wheel mounting portion and a ground contact portion provided a predetermined distance apart from and below the wheel mounting portion.

The dummy wheel enables the wheel alignment measurement for the wheel mounting portion as if the wheel were mounted on the wheel mounting portion only by mounting the dummy wheel on the wheel mounting portion on which the wheel is not mounted. Therefore, the apparatus is capable of measuring the wheel alignment with high accuracy without the wheel mounted on the wheel mounting portion and it is possible to preferably use the apparatus for the wheel alignment measurement in the assembly line of the vehicle body in which the wheels are not mounted on the wheel mounting portions.

As an example of a procedure for mounting the dummy wheel on the wheel mounting portion, the mounting member is previously attached to the axle end on the wheel mounting portion in the assembly line of the vehicle body. The vehicle body is conveyed to the position where the wheel alignment is measured and then the connecting means connects the connection frame to the mounting member. This enables the dummy wheel to be rapidly mounted on the wheel mounting portion. In the wheel mounting portion in this state, the ground contact portion of the dummy wheel is able to reproduce the same ground contact state as the wheel, and the measurement points on the wheel mounting portion are exposed from the open portion, thereby enabling easy measurement of the position and attitude of the wheel mounting portion related to the wheel alignment. The measurement points may be, for example, a part of the components constituting the wheel mounting portion such as the side surface of a braking device installed on the wheel mounting portion.

Further, preferably the mounting member of the dummy wheel includes a connecting shaft which extends coaxially with the wheel mounting portion and a connection hole which is formed in the connecting shaft and has a diameter gradually increasing toward the front end of the connecting shaft, and the connecting means includes a tapered shaft insertable into the connection hole and a holding mechanism which releasably holds the state where the tapered shaft is inserted into the connection hole. According to thereto, even in the case of an axis displacement between the connecting shaft and the tapered shaft, the large-sized open end of the connection hole is capable of smoothly receiving the small-sized distal end of the tapered shaft. Therefore, even in the case where the wheel mounting portion is tilted, it is possible to perform the connection between the mounting member and the connecting means reliably. Moreover, the holding mechanism provided in the connecting means is able to reliably maintain the state where the mounting member is integrally connected to the connection frame.

In this condition, preferably a brake disk is installed on a hub to which the wheel is to be connected in the wheel mounting portion, the mounting member of the dummy wheel is connected to the hub of the wheel mounting portion, and the open portion of the dummy wheel exposes a plurality of points on a disk surface of the brake disk as the measurement points. According thereto, it is possible to measure the wheel alignment for the disk surface of the high-precision brake disk exposed from the open portion of the dummy wheel, and the ground contact portion is able to produce the same ground contact state as the wheel mounting portion with the wheel mounted thereon, thereby enabling high accuracy measurement result by means of the measuring means.

Further in the apparatus of the present invention, the wheel mounting portion elevating means includes a load measuring means which measures a load of the wheel mounting portion in process of elevation via the dummy wheel. According thereto, particularly, the load applied from the wheel mounting portion to the dummy wheel is able to easily coincide with the load of the wheel mounting portion in the ground contact state in the finished vehicle at the time of the static alignment measurement, thereby enabling the accurate static alignment measurement of the wheel mounting portion in the same state as in the wheel mounting portion on which the wheel is mounted.

Further, in the above, preferably, the apparatus further comprises an elevation control means which stops the elevation of the wheel mounting portion at the time of coincidence between the load measured by the load measuring means and a preset load, and the measuring means measures the wheel alignment of the wheel mounting portion whose elevation is stopped by the elevation control means.

The provision of the elevation control means enables the four wheel mounting portions to be individually stopped at the time of coincidence between the load preset for each of the wheel mounting portions and the load measured by each load measuring means. The elevation control means stores the load preset for each wheel mounting portion as data and compares each load data with output data from the load measuring means. Each load data stored in the elevation control means is a value obtained by subtracting the weight of the wheel and the weight of the mounting nut for use in mounting the wheel from the value previously obtained by measuring each wheel mounting portion including the wheel of the finished vehicle (the vehicle body with the wheels mounted on the wheel mounting portions).

According to the elevation control means, for example, in the same manner as for the case of a difference between the left and right vehicle heights in the finished vehicle on which the wheels are mounted, it is possible to stop the wheel mounting portions at different height positions so as to correspond to the loads of the respective wheel mounting portions. Thereafter, the measuring means is capable of measuring the wheel alignment for the respective wheel mounting portions at the height positions. This enables the measuring means to provide a measurement result including the same state of the suspension as in the finished vehicle for each wheel mounting portion.

Further, in the apparatus according to the present invention, the wheel mounting portion elevating means includes a support plate which supports the dummy wheel from below, and the measuring means includes a sensor unit which is opposed to the measurement points on the wheel mounting portion in a noncontact state, a connecting member which connects the sensor unit to the support plate via a ball joint, and a follower operating means which causes the sensor unit to follow an up and down motion of the support plate performed by the wheel mounting portion elevating means via the connecting member with the sensor unit supported so as to be free to move up and down.

By using the above configuration, the measuring means prevents distortion and tilt from extending to the sensor unit even in the case of an occurrence of the distortion or tilt in the support plate under the load from the wheel mounting portion in process of elevation of the wheel mounting portion by the support plate of the wheel mounting portion elevating means, because the bending of the ball joint provided in the connecting member of the attitude angle measuring means absorbs the distortion or tilt of the holding means. This allows the attitude of the sensor unit opposed to the measurement points on the wheel mounting portion to be reliably maintained, thereby enabling high accuracy measurement of the attitude angle for the wheel mounting portion.

Moreover, the connecting member connects the sensor unit to the holding means via the ball joint and the follower operating means causes the sensor unit to reliably follow the up and down motion of the holding means performed by the wheel mounting portion elevating means. This allows the position of the sensor unit opposed to the measurement points on the wheel mounting portion to be reliably maintained, thereby enabling high accuracy measurement of the attitude angle for the wheel mounting portion.

Further, in the apparatus according to the present invention, the wheel mounting portion elevating means includes a support plate which is provided movably in an anteroposterior direction and in a left-right direction to support the dummy wheel from below, assuming that a vehicle length direction is the anteroposterior direction and a vehicle width direction is the left-right direction, and the dummy wheel includes a mounting member to be mounted on an axle end on the wheel mounting portion and a connection frame to be attachably and detachably connected to the mounting member. The apparatus further comprises: a moving distance measuring means which measures a moving distance of each connection frame in the anteroposterior direction and in the left-right direction from a reference position previously set for each connection frame via the support plate after four connection frames are connected to corresponding mounting members mounted on four wheel mounting portions; and an offset and setback detecting means which detects an offset, which is an amount of displacement in the middle position between the front and rear suspensions, and a setback, which is a left-and-right wheel base difference, from the coordinates of each wheel mounting portion based on the moving distance of each connection frame measured by the moving distance measuring means.

By using the mounting member and the connection frame of the dummy wheel configured as described above, the moving distance measuring means is capable of performing a direct measurement for each wheel mounting portion. Therefore, even in the case where the wheels are not mounted on the wheel mounting portions, respectively, it is possible to detect the offset and the setback previous to the alignment measurement with high accuracy, thereby enabling an inspection of the suspensions with no effect of a piece part accuracy or mounting condition of the wheels. Further, even in the case of an unfinished vehicle with the wheels not mounted on the wheel mounting portions, the apparatus is capable of detecting the offset and the setback, thereby enabling a preferable high accuracy inspection of the suspensions in the assembly line of the vehicle body so as to achieve a smooth and rapid feedback to an installation station of the suspensions in the assembly line.

Further in the apparatus according to the present invention, the measuring means includes a displacement amount detecting means, which is activated by power supply to detect a displacement amount at the measurement points on the wheel mounting portion, and a temperature detecting means, which detects a temperature of the displacement amount detecting means, and performs warm-up previous to performing alignment measurement of the wheel mounting portion from immediately after the start of the power supply to the measuring means until the temperature of the displacement amount detecting means reaches a predetermined temperature. The apparatus further comprises: a storage means which stores a first displacement amount which is a false displacement amount detected multiple times by the displacement amount detecting means due to an effect of a temperature change for a wheel mounting portion reproducing member secured in a fixed position, instead of the wheel mounting portion, and a temperature detected by a temperature detecting means at the time of detecting each first displacement amount during the warm-up of the measuring means; a rate-of-change calculating means which calculates a rate of change of the first displacement amount associated with the temperature change from each first displacement amount and temperature stored in the storage means during the warm-up; and a corrected displacement amount calculating means which calculates a correction value on the basis of the rate of change calculated by the rate-of-change calculating means and the temperature detected by the temperature detecting means at the time of detecting a second displacement amount, in the case of detecting the second displacement amount for the wheel mounting portion by the displacement amount detecting means by performing the alignment measurement of the wheel mounting portion after the completion of the warm-up, and outputs the displacement amount, which is corrected by subtracting the correction value from the second displacement amount, as a correct displacement amount.

According thereto, as described above, in case of a decrease in the measurement accuracy of the displacement amount detecting means due to the effect of the power supply or a change in the temperature environment, the displacement amount detected by the displacement amount detecting means is able to be accurately corrected, and therefore the apparatus is capable of performing extremely high accuracy alignment measurement.

Further, preferably the displacement amount detecting means is a laser sensor which detects the displacement amount by means of a laser beam reflected at the measurement points by irradiating the measurement points on the wheel mounting portion with the laser beam.

DETAILED DESCRIPTION OF THE PREFERRED EMBODIMENTS

Figure 1:
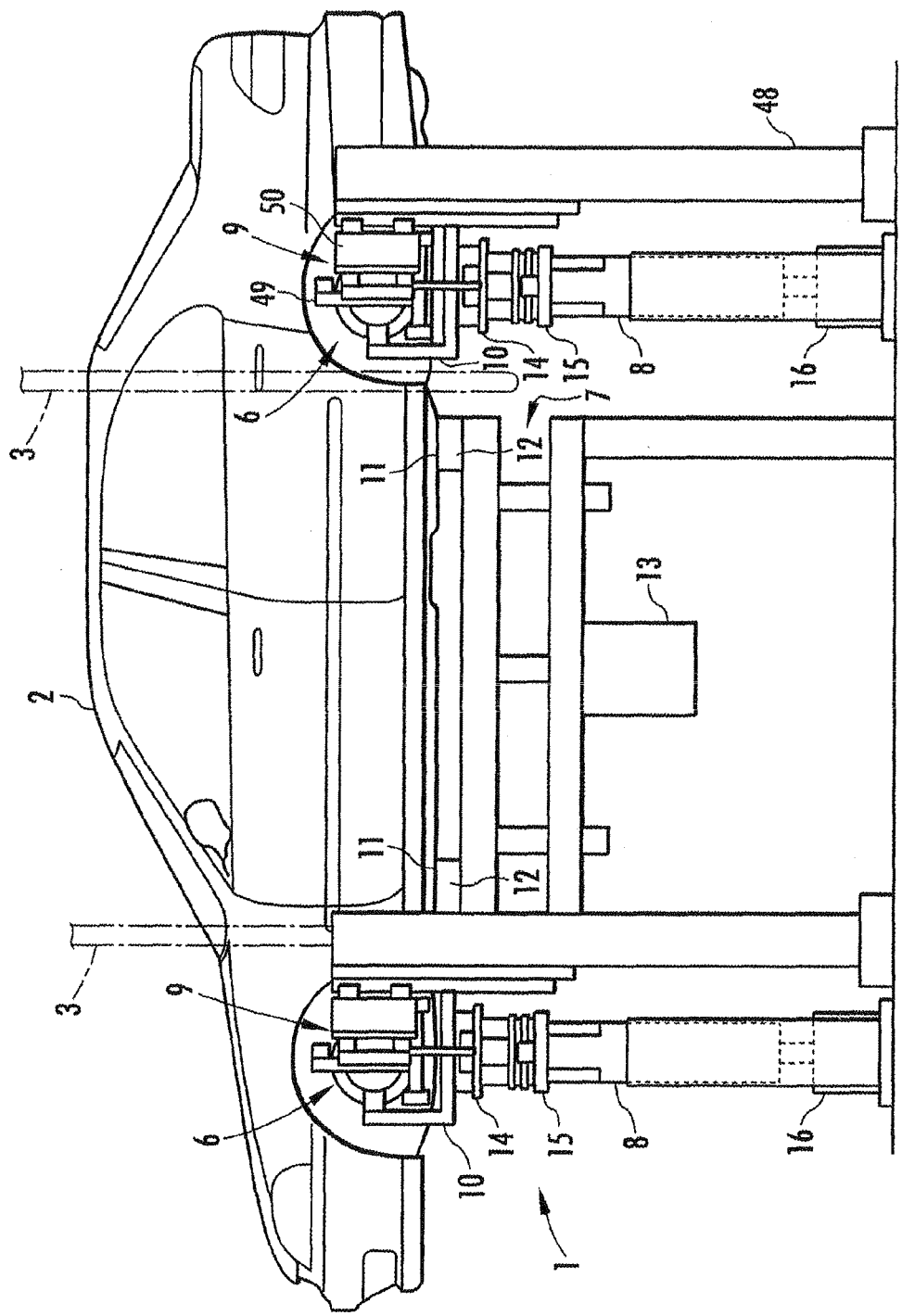
FIG. 1 is an explanatory side view illustrating the schematic configuration of an alignment measuring apparatus according to an embodiment of the present invention.
Figure 2:
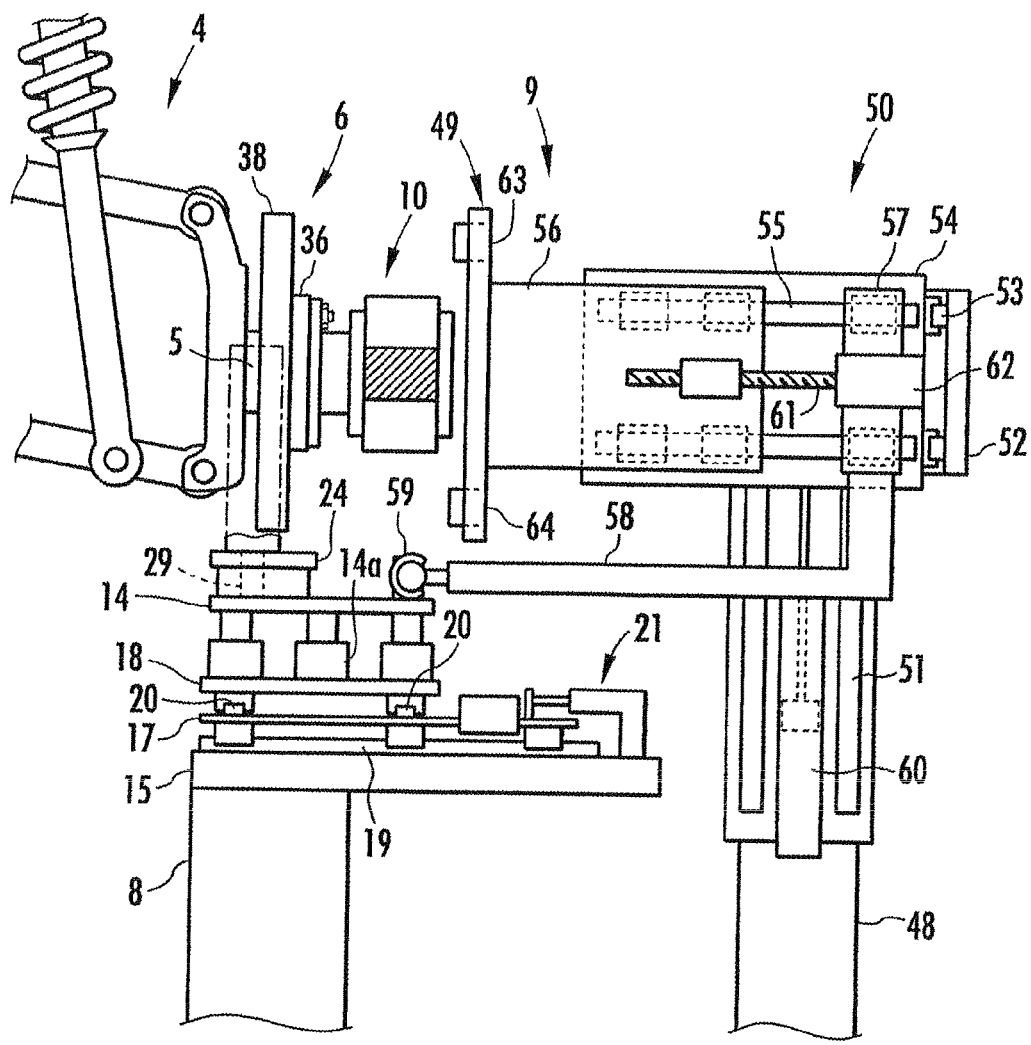
FIG. 2 is an explanatory diagram of a wheel mounting portion elevating means and an alignment measuring means.

As shown in FIG. 1, a wheel alignment measuring apparatus 1 of this embodiment is provided on a carrier line for a vehicle body 2 in the assembly line of the vehicle body 2. The vehicle body 2 is carried along the carrier line with being supported by hangers 3 (indicated by virtual lines). When reaching the position just above the wheel alignment measuring apparatus 1, the vehicle body 2 is transferred to the wheel alignment measuring apparatus 1 placed beneath the vehicle body 2. The vehicle body 2, which is to be carried to just above the wheel alignment measuring apparatus 1, is provided with suspensions 4 (a part of which is shown in FIG. 2) installed in the vehicle body 2 in the upstream and the steering, which is not shown, is set to the neutral position. Moreover, as shown in FIG. 2, a wheel mounting portion 6 for mounting the wheel is provided at an axle end of an axle 5 connected to the suspension 4, though a wheel is not mounted yet on the wheel mounting portion 6 in this state.)

As shown in FIG. 1, the wheel alignment measuring apparatus 1 includes a vehicle body support means 7 which supports the vehicle body 2 with the vehicle body 2 detached from the hangers 3 thereabove, wheel mounting portion elevating means 8 each of which elevates the wheel mounting portion 6 elevatable in a state of hanging from the vehicle body 2 supported by the vehicle body support means 7, and alignment measuring means 9 (measuring means) each of which measures an attitude angle (a toe angle and a camber angle) by detecting a displacement of the wheel mounting portion 6, and dummy wheels 10 which are attached to the wheel mounting portions 6 to simulate a situation where wheels are mounted on the wheel mounting portions 6.

The vehicle body support means 7 includes placement sections 12 for use in placing the vehicle body 2, each abutting against a region of a jack-up bracket 11 provided in the vehicle body 2 from below, and a vehicle body lifter 13 which lifts the vehicle body 2 via the placement sections 12. Moreover, although not shown, each placement section 12 is provided with a clamping mechanism for clamping the region of the jack-up bracket 11 so as to be free to release the clamping force.

As shown in FIG. 1, each wheel mounting portion elevating means 8 includes a support plate 14 which is provided in such a way as to correspond to each of the four wheel mounting portions 6 to support the wheel mounting portion 6 via the dummy wheel 10, a lifting table 15 which connects to the support plate 14 so as to move freely in the anteroposterior direction and in the left-right direction, and a lifting device 16 composed of a cylinder or the like which lifts and lowers the lifting table 15.

As shown in FIG. 2, the lifting table 15 supports the support plate 14 via a first movable plate 17 and a second movable plate 18. The first movable plate 17 is guided in the left-right direction by a rail 19 on the lifting table 15 and the second movable plate 18 is guided in the anteroposterior direction by a rail 20 on the first movable plate 17. Moreover, a drive unit 21 provided on the lifting table 15 moves the first movable plate 17 in the left-right direction, and an encoder, which is not shown, detects the moving distance in the left-right direction from the original position. Similarly, a drive unit, which is not shown, provided on the first movable plate 17 moves the second movable plate 18 in the anteroposterior direction and an encoder, which is not shown, detects the moving distance in the anteroposterior direction from the original position.

The moving distance of each wheel mounting portion 6 output from the corresponding encoder is input as position data into a computer, which is not shown. The encoders constitute a moving distance measuring means of the present invention. The computer has a function of an offset/setback detecting means of the present invention, which detects an offset as an amount of displacement in the middle position between the front and rear suspensions and a setback as a left-and-right wheel base difference, with the coordinates of each wheel mounting portion 6 identified from the moving distance of the wheel mounting portion 6.

Moreover, although not shown, the lifting table 15 is provided with a load measuring means 14a which measures a load applied from the wheel mounting portion 6 via the support plate 14 and the computer has an elevation control means as its function. The elevation control means stores load data preset so as to correspond to the wheel mounting portion 6. When the load data coincides with the load measured by the load measuring means 14a, the elevation control means controls the lifting device 16 to stop the elevation of the wheel mounting portion 6. The load data stored in the elevation control means is a value obtained by previously subtracting the weight of the wheel from a value measured for each wheel mounting portion 6 including the wheel of a finished vehicle 100 (See FIG. 11).

Figure 3:
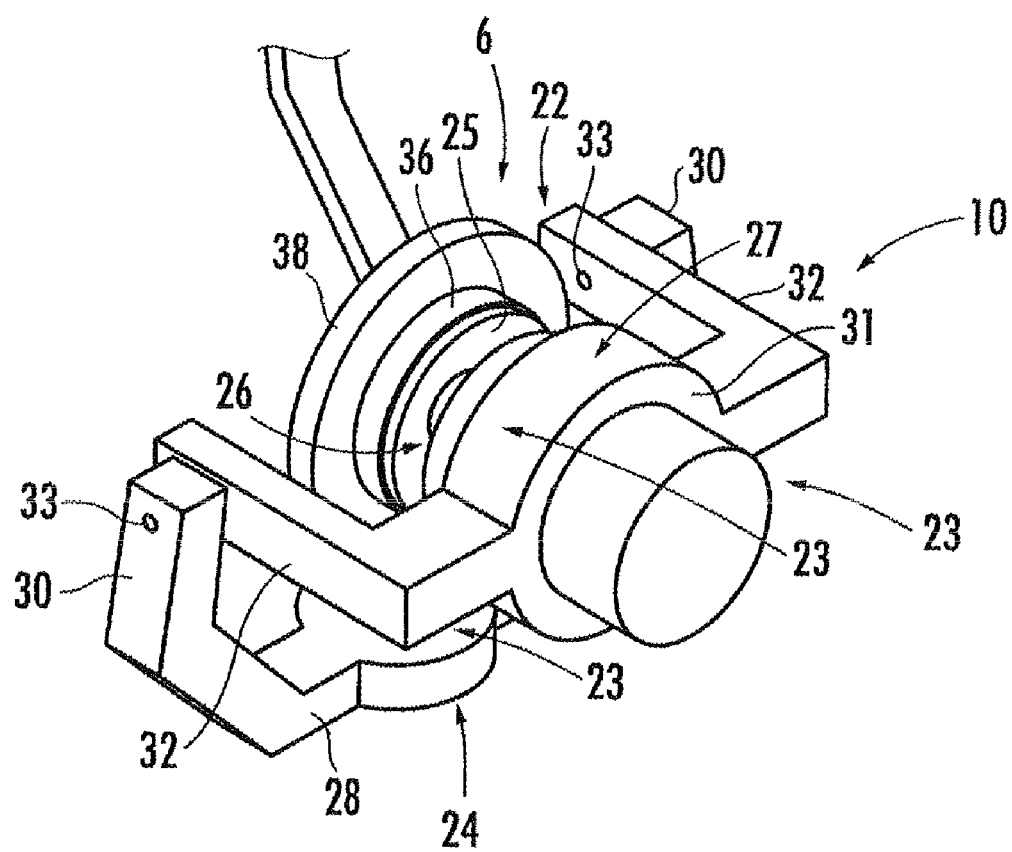
FIG. 3 is an explanatory perspective diagram of a dummy wheel.

As shown in FIG. 3, the dummy wheel 10 has a connection frame 22 for connection to the wheel mounting portion 6 and the connection frame 22 includes an open portion 23 which exposes measurement points, which will be described later, on the wheel mounting portion 6 and a ground contact portion 24 provided a predetermined distance apart from and below the wheel mounting portion 6. Moreover, the dummy wheel 10 includes a mounting member 25 to be attached to the wheel mounting portion 6. The connection frame 22 is composed of a first frame 27 which connects to the mounting member 25 attachably and detachably via a connecting means 26 and a second frame 28 which swingably connects to and supports the first frame 27.

The second frame 28 includes the ground contact portion 24 at its lower end and is rotatably connected to the support plates 14 via a rotating shaft 29 as shown in FIG. 2. As shown in FIG. 3, a pair of vertical arms 30 extending upward are provided in a coupled manner on both sides of the ground contact portion 24 in the anteroposterior direction thereof.

Figure 4:
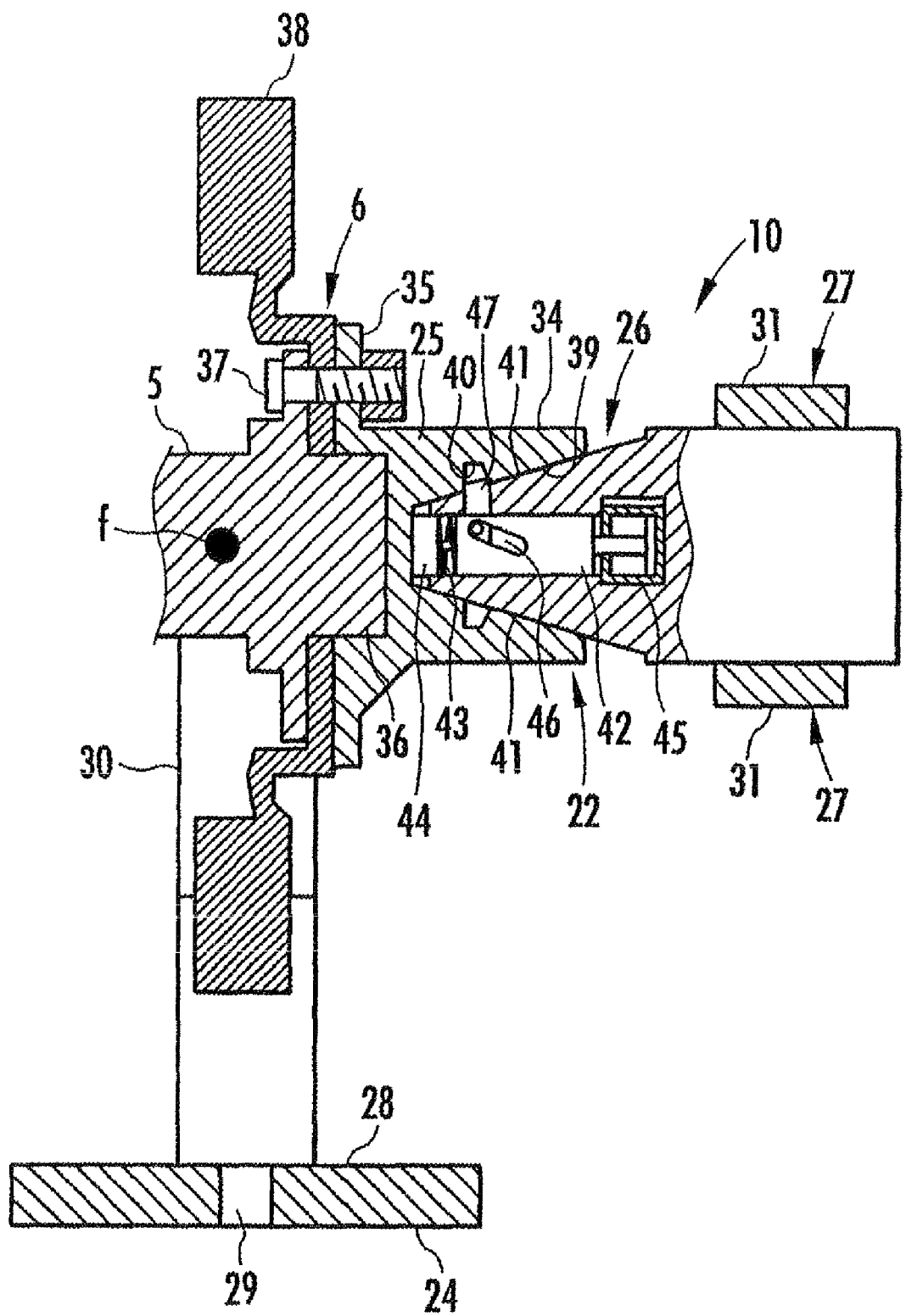
FIG. 4 is an explanatory sectional view illustrating a connected state of a connecting means of the dummy wheel.
Figure 5:
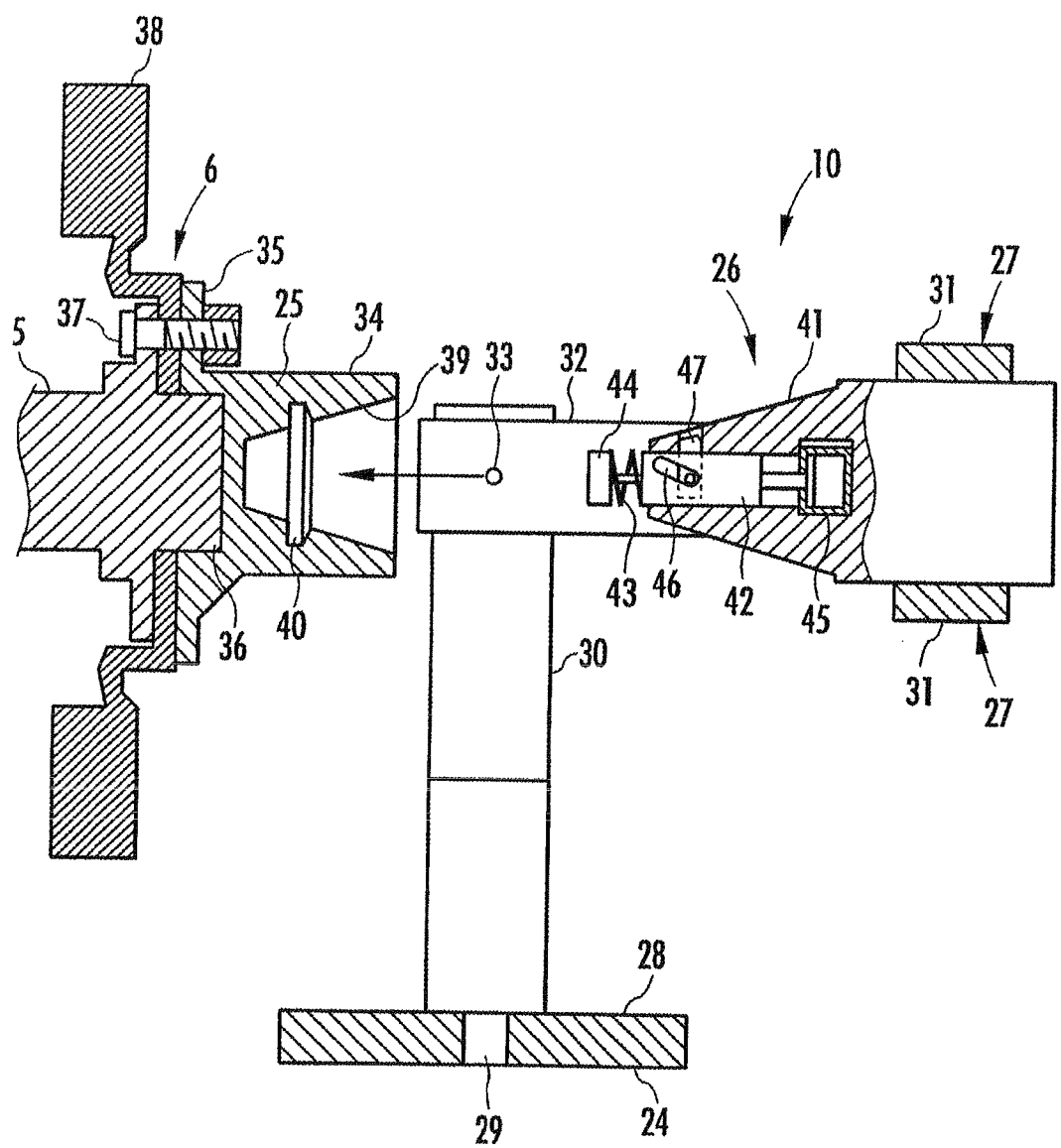
FIG. 5 is an explanatory sectional view illustrating an unconnected state of the connecting means of the dummy wheel.

The first frame 27 includes a holding portion 31, which holds the connecting means 26 so as to be free to advance and retreat with respect to the wheel mounting portion 6, and a pair of horizontal arms 32 on both sides of the holding portion 31 in the anteroposterior direction thereof, which are provided in a coupled manner. The horizontal arms 32 extend toward the front and back sides of the wheel mounting portion 6 and are rotatably connected to the vertical arms 30 via rotating shafts 33, respectively. The connection structure between the horizontal arms 32 and the vertical arms 30 provides an open space between the first frame 27 and the second frame 28 and forms the open portion 23, As shown in FIG. 4 and FIG. 5, the mounting member 25 includes a connecting shaft 34 which extends coaxially with the wheel mounting portion 6 and a fixed portion 35 which projects in a flange shape in the outer periphery of the connecting shaft 34, and the fixed portion 35 is mounted on a hub 36 of the wheel mounting portion 6 with a wheel fixing bolt 37. The mounting work of the mounting member 25 onto the wheel mounting portion 6 is performed in the upstream of the wheel alignment measuring apparatus 1 in the assembly line of the vehicle body 2.

A brake disk 38 is installed on the outer periphery of the hub 36 of the wheel mounting portion 6 and the mounting member 25 is formed in a size not covering the disk surface of the brake disk 38.

The connecting shaft 34 of the mounting member 25 has a connection hole 39, which is formed therein and has a diameter gradually increasing toward the front end of the connecting shaft 34, and a locking groove 40 is formed inside the connection hole 39.

The connecting means 26 includes a tapered shaft 41 insertable into the connection hole 39 of the mounting member 25. The tapered shaft 41 is provided with a sliding member 42 which slides along the axis of the tapered shaft 41, and an abutting member 44 is provided at the distal end of the sliding member 42 with the abutting member 44 biased against the sliding member 42 in the projecting direction by means of a spring member 43. On the other hand, a cylinder 45, which drives the sliding member 42, is provided at the proximal end of the sliding member 42. Further, the sliding member 42 holds a detent member 47 via a cam groove 46. The detent member 47 guided into the cam groove 46 projects from the outer periphery of the tapered shaft 41 when the sliding member 42 slides in the distal end direction and the detent member 47 guided into the cam groove 46 retreats from the outer periphery of the tapered shaft 41 when the sliding member 42 slides in the proximal end direction.

This causes the tapered shaft 41 of the connecting means 26 to connect to the mounting member 25 with the detent member 47 locked with the locking groove 40 by sliding the sliding member 42 toward the proximal end thereof by means of the cylinder 45 while inserting the sliding member 42 into the connection hole 39 of the mounting member 25. In this state, the abutting member 44 abuts against the innermost end of the connection hole 39 to bias the sliding member 42 toward the proximal end, thereby maintaining the state where the detent member 47 is locked with the locking groove 40. Moreover, the large-sized part of the connection hole 39 guides the small-sized distal end of the tapered shaft 41 when the tapered shaft 41 is inserted into the connection hole 39. Therefore, even in the case of misalignment with the connection hole 39 of the mounting member 25, the tapered shaft 41 of the connecting means 26 achieves a secure connection with the axis coinciding with the axis of the connection hole 39.

Further, the connecting means 26 is secured to the holding portion 31 in the position corresponding to the wheel offset dimension of the wheel mounting portion 6, and the axis of the rotating shaft 29 of the ground contact portion 24 is located just under the power point f of an axial load applied to the axle 5 of the wheel mounting portion 6 so that the state coincides with a state where the wheel is actually mounted on the wheel mounting portion 6. This achieves the state where the wheel is mounted on the wheel mounting portion 6 in a simulated manner without mounting the wheel on the wheel mounting portion 6 only by connecting the dummy wheel 10 to the wheel mounting portion 6. In the case of a change in the vehicle type of a vehicle which is a target for the measurement, the mounting member 25 corresponding to the vehicle type is mounted on the wheel mounting portion 6. In this case, it is convenient to prepare, for each vehicle type, the mounting member 25 having an extended dimension of the connecting shaft 34 coinciding with the wheel offset dimension of each vehicle type, for example. This enables the rotating shaft 29 of the ground contact portion 24 to be located just under the power point f of the axial load of the wheel mounting portion 6 only by connecting the mounting member 25 to the connecting means 26 without changing the shape of the first frame 27 or the second frame 28 in conformity with the change of the vehicle type.

Moreover, the dummy wheel 10 is configured so as to follow the attitude of the wheel mounting portion 6 when the dummy wheel 10 is connected to the wheel mounting portion 6 due to the ground contact portion 24 rotatable with respect to the support plate 14 via the rotating shaft 29 and the horizontal arm 32 rotatable (swingable) with respect to the vertical arm 30 via the rotating shaft 33.

Further, the dummy wheel 10 includes an original position returning mechanism, which is not shown, for returning the attitude of the horizontal arm 32 and the orientation of the vertical arm 30 to the original position where the connecting means 26 is opposed to the mounting member 25 if the dummy wheel 10 is not connected to the wheel mounting portion 6.

Figure 6:
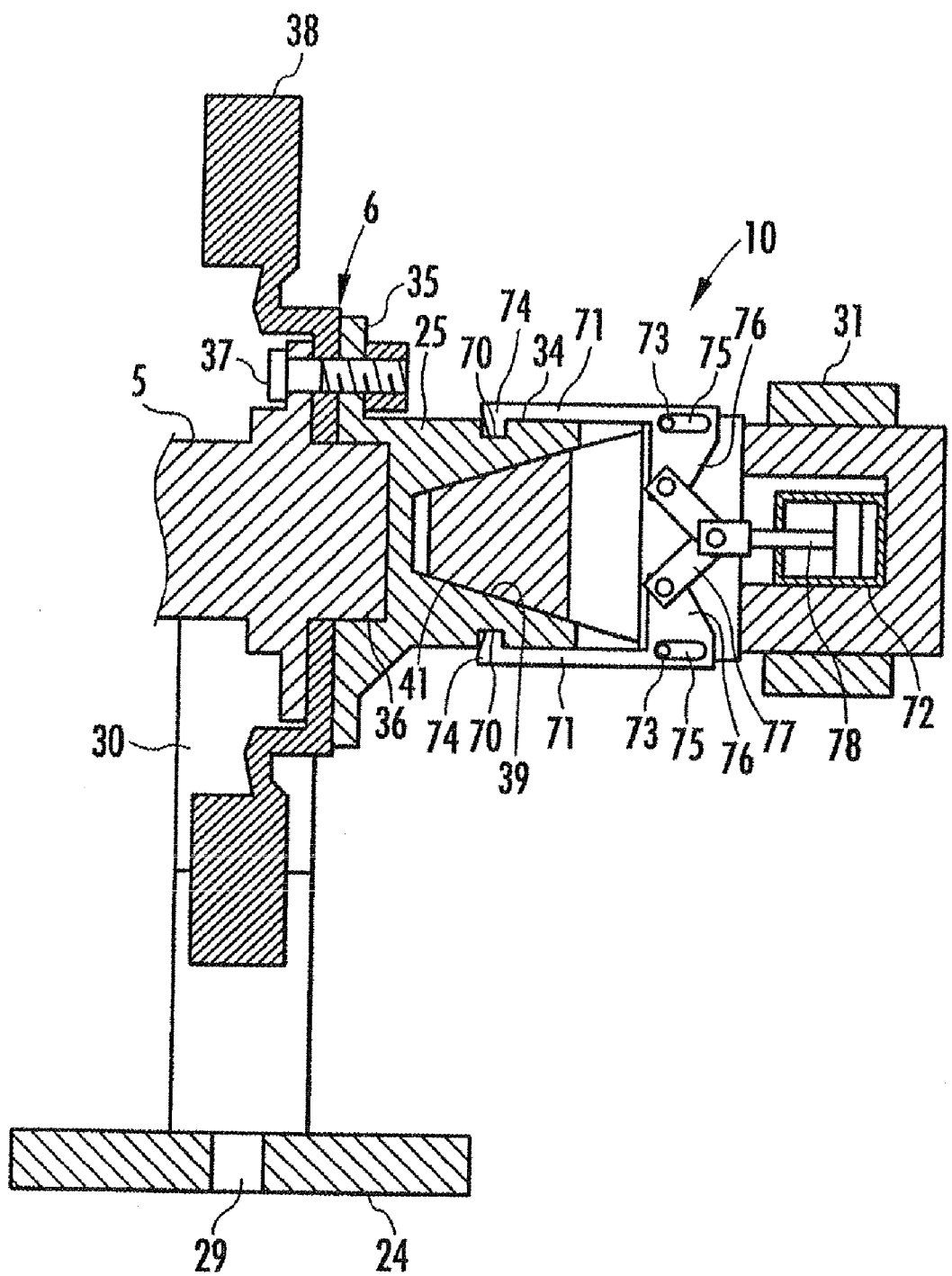
FIG. 6 is an explanatory sectional view illustrating a connected state of another connecting means of the dummy wheel.
Figure 7:
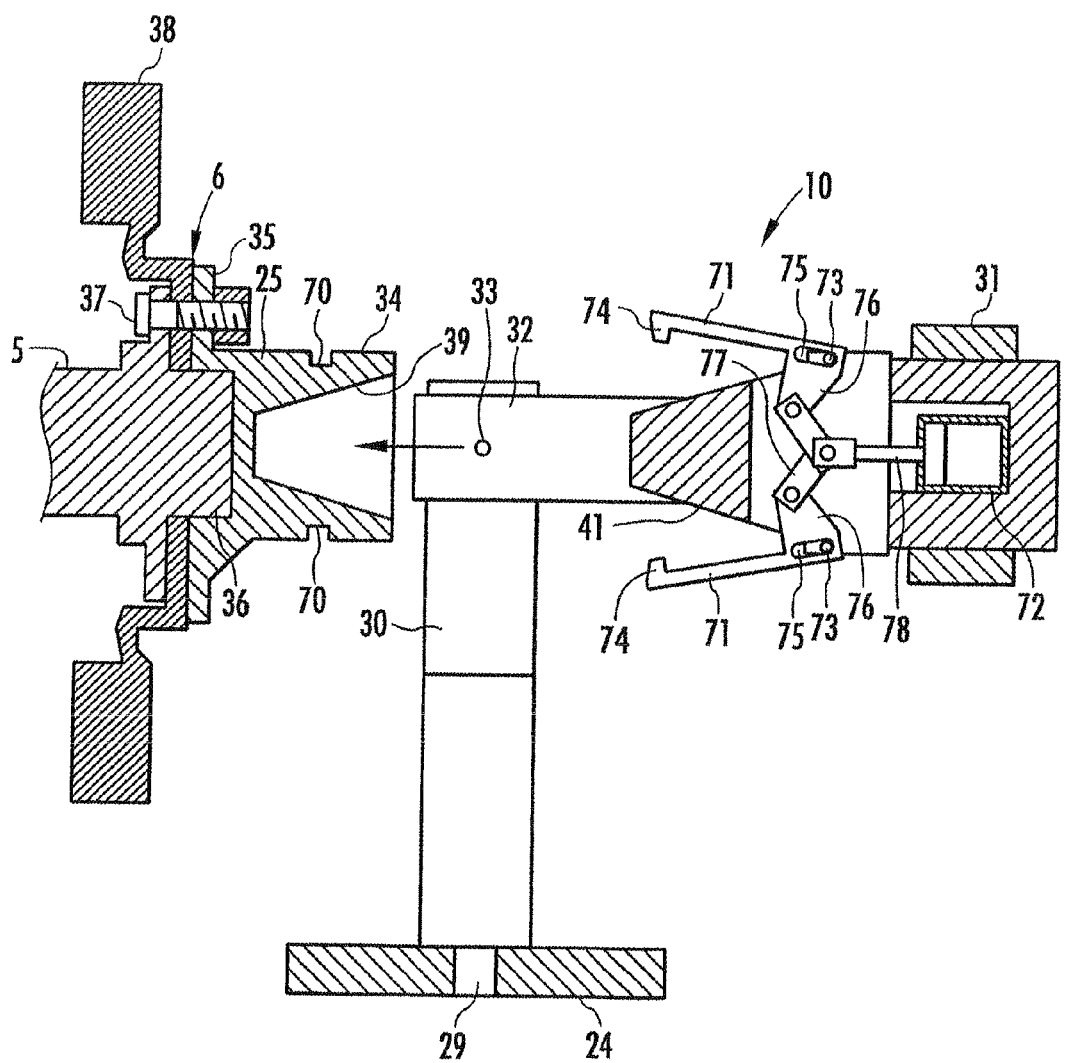
FIG. 7 is an explanatory sectional view illustrating an unconnected state of the connecting means shown in FIG. 6.

The mechanism for connecting the connection frame 22 to the mounting member 25 may be configured as shown in FIG. 6 and FIG. 7 besides the above configuration. Specifically, as shown in FIG. 6 and FIG. 7, a locking groove 70 is provided in the outer periphery of the connecting shaft 34 of the mounting member 25 for connection to the locking groove 70 from the outside of the connecting shaft 34. The tapered shaft 41 of the connecting means 26 is provided with a plurality of swingable gripping members 71 and a cylinder 72 which swings the respective gripping members 71 to open and close the gripping members 71. The tapered shaft 41 supports each of the gripping members 71 via a support shaft 73. A locking pawl 74 which engages with the locking groove 70 is formed at the distal end of each gripping member 71. A slot 75 is formed in each gripping member 71 and a base 76 extending to the inner side of the slot 75 is connected to the tip of the piston rod 78 of the cylinder 72 via a link member 77. Further, the piston rod 78 of the cylinder 72 is extended when the tapered shaft 41 of the connecting means 26 is inserted into the connection hole 39 of the mounting member 25, by which the gripping members 71 swing in a direction of mutually closing the gripping members 71 and the locking pawls 74 engage with the locking groove 70, thereby maintaining the connection to the mounting member 25.

As shown in FIG. 2, the alignment measuring means 9 includes a columnar frame 48 which is erected adjacent to the wheel mounting portion elevating means 8, a sensor unit 49 which is opposed to the wheel mounting portion 6, and a support mechanism 50 which intervenes between the sensor unit 49 and the columnar frame 48 to support the sensor unit 49. The alignment measuring means 9 further includes a computing means such as a computer, which is not shown, which calculates measured values of the wheel alignment.

The support mechanism 50 includes a lifting frame 52 which is free to move up and down along a rail 51 provided on the side wall of the columnar frame 48 and extending in the vertical direction, a sliding frame 54 which is free to slide along a rail 53 provided on the vertical wall of the lifting frame 52 and extending in the anteroposterior direction (the vehicle length direction), and two advancing/retreating frames 56 and 57 free to slide in the advancing/retreating direction with respect to the wheel mounting portion 6 along a rail 55 provided on the side wall of the sliding frame 54. The distal end edge of the first advancing/retreating frame 56 is continuously connected to the sensor unit 49. The second advancing/retreating frame 57 is continuously connected to the support plate 14 of the wheel mounting portion elevating means 8 via the connecting arm 58 with the distal end of the connecting arm 58 continuously connected to the support plate 14 via a ball joint 59 which is a bendable joint.

The columnar frame 48 is provided with an assist cylinder 60 for causing the support mechanism 50 to follow the up and down motion of the support plate 14 via the lifting frame 52. Moreover, the second advancing/retreating frame 57 is provided with a ball screw 61 which follows the movement of the first movable plate 17 to advance and retreat the first advancing/retreating frame 56 and a drive motor 62 which rotates the ball screw 61 according to the moving distance of the first movable plate 17. The sliding frame 54 is slidable along the rail 51 of the lifting frame 52 and thereby follows the movement of the second movable plate 18.

Figure 8:
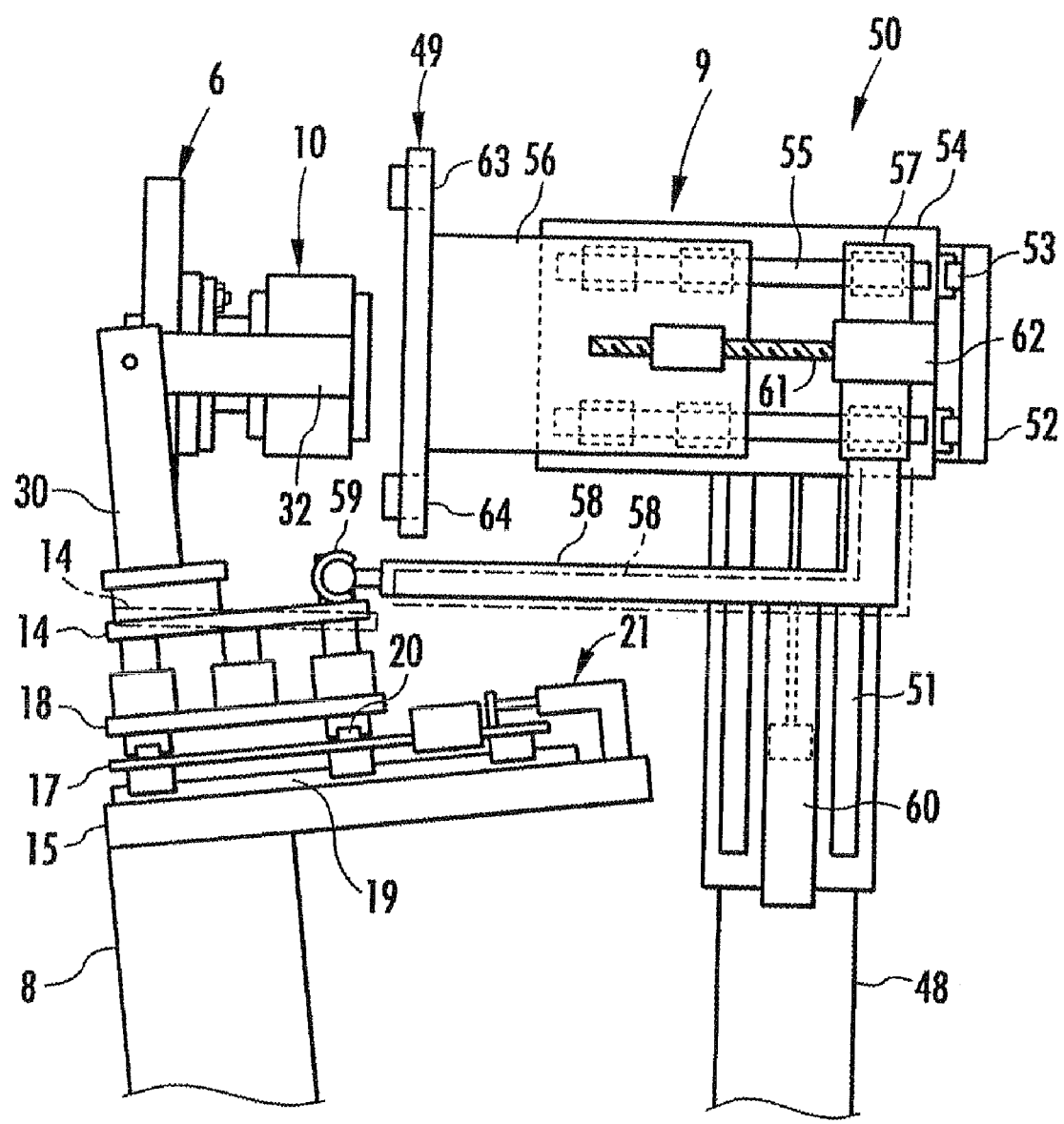
FIG. 8 is an explanatory diagram illustrating the working of a ball joint of a connecting member in the alignment measuring means.

According to the above configuration, the alignment measuring means 9 follows the height and the back and forth, left and right movements of the wheel mounting portion 6 on the support plate 14 via the connecting arm 58. Further, as shown in FIG. 8, in case of an occurrence of distortion or tilt in the support plate 14 due to a load applied to the support plate 14 by the wheel mounting portion 6, bending at the ball joint 59 absorbs the distortion or tilt of the support plate 14 so as to prevent the distortion or tilt from spreading to the sensor unit 49. Therefore, it is possible to measure alignment with high accuracy by preventing the effect of the load applied from the wheel mounting portion 6.

Figure 9:
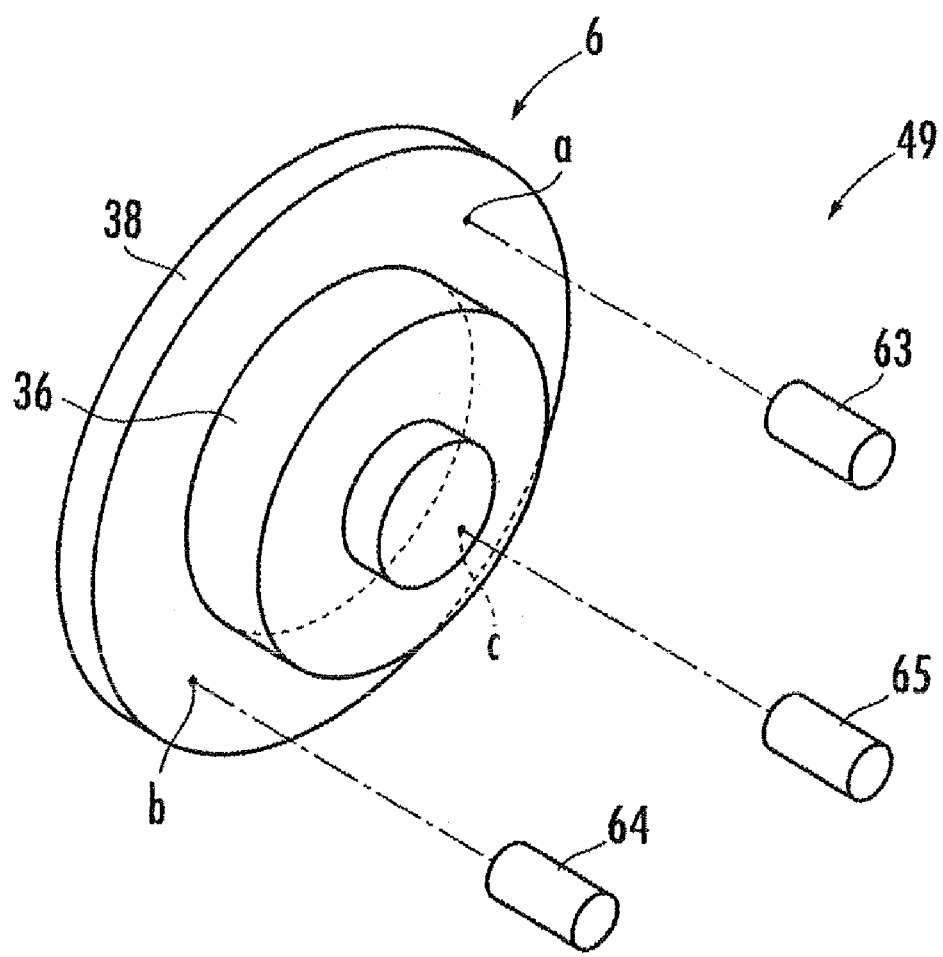
FIG. 9 is an explanatory diagram illustrating a positional relationship between three sensors of a sensor unit provided in the alignment measuring means

Moreover, as shown in FIG. 9, the sensor unit 49 includes three laser sensors (a first sensor 63, a second sensor 64, and a third sensor 65) as displacement amount detecting means. The first sensor 63, the second sensor 64, and the third sensor 65 are respectively opposed to three points a, b, and c (measurement points) set on the disk surface of the brake disk 38 installed on the wheel mounting portion 6. The first sensor 63 measures a distance to the point a on the brake disk 38, the second sensor 64 measures a distance to the point b on the brake disk 38, and the third sensor 65 measures a distance to the point c on the brake disk 38. The three points a, b, and c (measurement points) are exposed by the open portion 23 of the dummy wheel 10, and therefore the dummy wheel 10 does not interfere with the measurement of a toe angle and a camber angle performed by the sensor unit 49. Moreover, since the disk surface of the brake disk 38 is smoothly formed with high accuracy, the setting of the three points a, b, and c as measurement points on the disk surface allows the achievement of extremely accurate measurement result of the toe angle and the camber angle.

Moreover, the first sensor 63, the second sensor 64, and the third sensor 65 are each provided with a temperature detecting means, which is not shown, thereby enabling the detection of a temperature of each sensor when detecting a displacement. A storage means provided in the foregoing computer, which is not shown, stores the values measured by the sensor unit 49 and the temperatures detected by the temperature detecting means. For the temperature detecting means, for example, a thermocouple may be used.

Further, the computer has not only a function of a computing means which calculates the measured values of the wheel alignment, but also a function of a rate-of-change calculating means and a function of a corrected displacement amount calculating means of the present invention.

More specifically, the computer finds a vertical displacement with respect to the center between the point a and the point b or the point c on the basis of a difference in distance measured by the first sensor 63, the second sensor 64, and the third sensor 65 and detects the camber angle from the displacement. Moreover, the computer finds a horizontal displacement between the point b and the point c on the basis of a difference in distance measured by the second sensor 64 and the third sensor 65 and detects the toe angle from the displacement. Further, the computing means forms a toe angle change curve on the basis of toe angles at a plurality of height positions detected by a position detecting means, which is not shown and which is provided to the wheel mounting portion elevating means 8 and detects the position of the wheel mounting portion 6 to the vehicle body 2, and forms a camber angle change curve on the basis of camber angles at a plurality of height positions to display the change curves.

Moreover, when the computer functions as the rate-of-change calculating means and as the corrected displacement amount calculating means, the computer calculates a rate of change of a first displacement amount associated with a temperature change on the basis of the first displacement amount and the temperatures of the sensors stored in the storage means, finds a correction value based on the rate of change, and outputs a displacement amount corrected by subtracting the correction value from a second displacement amount, which is actually measured, as described later.

The following describes a wheel alignment measuring method performed by the wheel alignment measuring apparatus 1 having the above configuration.

When the vehicle body 2 supported by the hangers 3 is conveyed to a position just above the wheel alignment measuring apparatus 1 as shown in FIG. 1, the vehicle body support means 7 is elevated to cause a region of each jack-up bracket 11 of the vehicle body 2 to abut against the placement section 12 (vehicle body support step). In this instance, the mounting members 25 of the dummy wheels 10 have been respectively attached to the wheel mounting portions 6 in the upstream. Thereafter, the vehicle body lifter 13 of the vehicle body support means 7 lifts the vehicle body 2 to move the vehicle body 2 away from the hangers 3 upward and clamps the vehicle body 2 by the placement sections 12 so as to disable elevation thereof.

Subsequently, each wheel mounting portion elevating means 8 elevates the support plate 14 to connect the connection frame 22 of the dummy wheel 10 provided on the support plate 14 to the mounting member 25 by means of the connecting means 26 of the connection frame 22. This causes the dummy wheel 10 to be attached to the wheel mounting portion 6 on the support plate 14 (dummy wheel attachment step) to simulate a situation where the wheel is mounted on the wheel mounting portion 6 by means of the dummy wheel 10 though the wheel is not mounted on the wheel mounting portion 6 actually. In this instance, as shown in FIG. 2, the sensor unit 49 is opposed to the wheel mounting portion 6 via the dummy wheel 10. The sensor unit 49 is retracted in a direction away from the wheel mounting portion 6 before the connecting means 26 of the dummy wheel 10 is connected to the mounting member 25. After the connecting means 26 of the dummy wheel 10 is connected to the mounting member 25, the sensor unit 49 advances toward the wheel mounting portion 6 and is opposed to the wheel mounting portion 6 in a noncontact state with a predetermined distance apart from the wheel mounting portion 6.

Subsequently, the wheel mounting portion elevating means 8 elevates the wheel mounting portion 6 via the support plate 14 (wheel mounting portion elevating step) to measure the toe angle and the camber angle by means of the sensors 63, 64, and 65 of the sensor unit 49 (measurement step). In this step, measurement is performed for the measurement points (a, b, and c) set on the disk surface of the brake disk 38 exposed from the dummy wheel 10. This enables a high accuracy measurement result in comparison with a case, for example, where measurement points are set on the side wall of the wheel (tire and road wheel). In the measurement step, it is possible to measure the wheel alignment in a stationary state with the vehicle weight received by the dummy wheels (static alignment measurement step) and also to measure the wheel alignment while elevating the wheel mounting portions relatively to the vehicle body via the dummy wheels (dynamic alignment measurement step).

In the static alignment measurement step, after the release of the clamping of the jack-up brackets 11 in the placement sections 12 of the vehicle body support means 7, the wheel mounting portion elevating means 8 elevates the wheel mounting portions 6 via the support plates 14. In this process, the wheel mounting portion elevating means 8 elevates all support plates 14 while keeping them at the same height. Thereafter, when the vehicle body 2 departs upward from the vehicle body support means 7 (the jack-up brackets 11 respectively separate from the placement sections 12), the elevation of the vehicle body 2 is stopped to perform the wheel alignment measurement for the wheel mounting portions 6 in this position. Since the dummy wheels 10 are attached to the wheel mounting portions 6, respectively, a load is applied to the wheel mounting portions 6 in the same condition as the wheels were attached to the wheel mounting portions 6. This allows the wheel alignment measurement to be performed in a very similar condition to a finished vehicle (a vehicle body with wheels actually attached thereto), thereby providing a very accurate measurement result of static alignment.

Moreover, alternatively in another static alignment measurement step, it is possible to measure static alignment with the jack-up brackets 11 clamped to the placement sections 12 of the vehicle body support means 7. Specifically, with the jack-up brackets 11 clamped to the placement sections 12 of the vehicle body support means 7 to prevent the elevation of the vehicle body 2, the wheel mounting portion elevating means 8 elevate the wheel mounting portions 6 via the support plates 14, respectively.

In this condition, the load measuring means 14a continuously measures a load from the wheel mounting portion 6 in process of elevation (load measurement step). The elevation control means compares preset load data (set load) with a load measured by the load measuring means 14a. The load measurement by the load measuring means 14a and the comparison of the load by the elevation control means are performed for each wheel mounting portion 6 individually.

Figure 10:
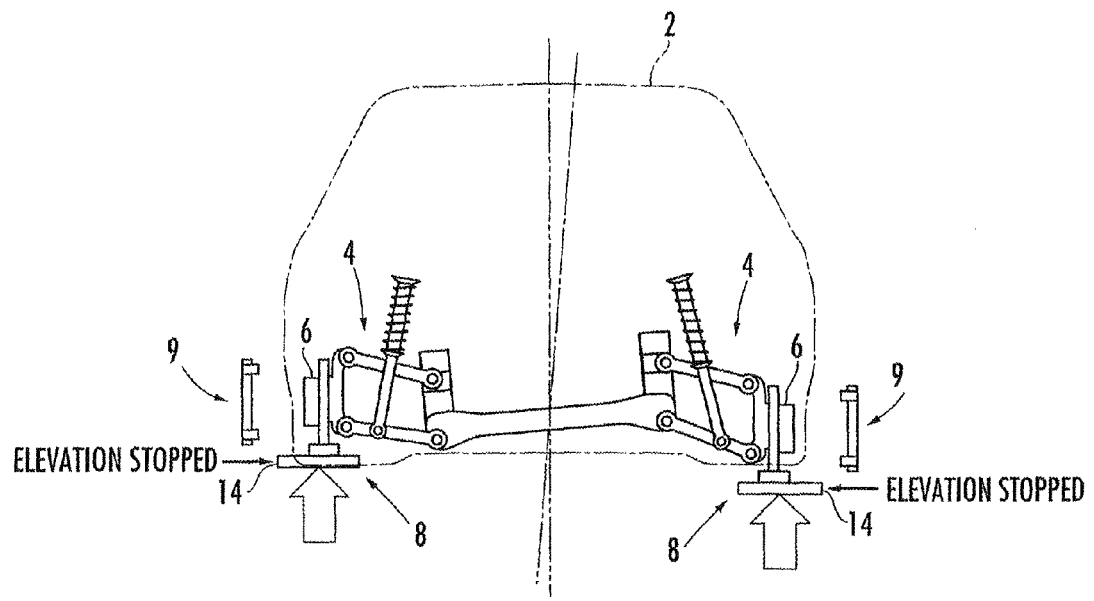
FIG. 10 is an explanatory diagram typically illustrating a measurement state of the wheel alignment.

Thereafter, the elevation control means stops the elevation of the wheel mounting portions 6 by the support plates 14 of the wheel mounting portion elevating means 8 as shown in FIG. 10 when the load measured by the load measuring means 14a coincides with the stored load data (elevation stop step). In FIG. 10, the dummy wheels 10 are not shown for convenience of description. After the stop of the elevation of the four wheel mounting portions 6 as described above, each alignment measuring means 9 measures an attitude angle for each wheel mounting portion 6 (measurement step).

Figure 11:
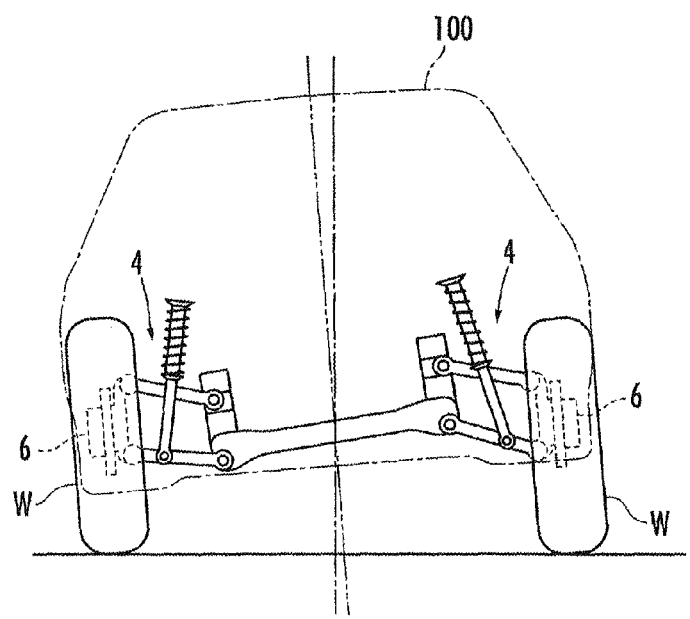
FIG. 11 is an explanatory diagram illustrating a state of suspensions of a finished vehicle.

As shown in FIG. 11, a difference may occur between the left and right vehicle heights due to an effect of uneven suspensions 4 in the finished vehicle 100. In this embodiment, as described above, a load is previously measured for each wheel mounting portion 6 including the wheel W (tire and road wheel) of the finished vehicle 100, and each elevation control means stores a value, which is obtained by subtracting the weight of the wheel W and the weight of a mounting nut (not shown) for mounting the wheel W on the wheel mounting portion 6 from the measured value, as the load data. If the elevation of each wheel mounting portion 6 is stopped by using the load data, the suspension 4 is put in the same state as in the finished vehicle relative to the vehicle body 2 as shown in FIG. 10. Then, the attitude angle is measured for each wheel mounting portion 6 in the state shown in FIG. 10, by which the state of the suspension 4 in the finished vehicle 100 shown in FIG. 11 is considered for the measurement result and a high accuracy measurement result is obtained. In FIG. 10 and FIG. 11, the states of the suspensions 4 are shown in an exaggerated manner for convenience of description.

In the dynamic alignment measurement step, with the jack-up brackets 11 clamped to the placement sections 12 of the vehicle body support means 7 to prevent the elevation of the vehicle body 2, the respective wheel mounting portion elevating means 8 elevate the wheel mounting portions 6 via the support plates 14. In this regard, with the position of each wheel mounting portion 6 corresponding to the vehicle height set at the time of vehicle body design as a reference, the elevation range of each support plate 14 of the four wheel mounting portion elevating means 8 extends from below to above the reference. In the elevation range, the wheel mounting portion is elevated relatively to the vehicle body while measuring a change in the toe angle and a change in the camber angle of the wheel mounting portion 6 in process of elevation.

Since the dummy wheels 10 are attached to the wheel mounting portions 6, respectively, the wheel mounting portions 6 behave in the same manner as the wheels were attached to the wheel mounting portions 6. This allows the wheel alignment measurement to be performed in a very similar condition to the finished vehicle (vehicle body with wheels actually attached thereto), thereby providing a very accurate measurement result of dynamic alignment.

Either of the static alignment measurement step and the dynamic alignment measurement step may be performed earlier. Moreover, it is possible to perform only one of the static alignment measurement step and the dynamic alignment measurement step as required.

Further, the alignment measuring method of the present invention is able to provide a worker with the high accuracy measurement result in the following procedure at the time of fixing the wheel alignment, thereby achieving high accuracy wheel alignment with the dynamic wheel alignment considered. Specifically, first, a predetermined position in a range where the wheel mounting portion is able to move up and down is set as a temporary vehicle height reference for the vehicle body 2 secured to the vehicle body support means 7 in the vehicle body support step (first reference setting step). The temporary vehicle height reference is obtained by estimating the height position of the wheel mounting portion at the actual vehicle height obtained in a state where the wheels are in contact with the ground in the finished vehicle (the vehicle body with the wheels in contact with the ground after the completion of mounting the wheels on the wheel mounting portions).

Subsequently, the respective wheel mounting portion elevating means 8 elevate the wheel mounting portions 6 with the vehicle body 2 kept to be secured to the vehicle body support means 7 (wheel mounting portion elevating step). The elevation of the wheel mounting portions 6 is also effective as a work of adapting components such as rubber bushings constituting the suspensions 4 to achieve smooth operations of the suspensions 4 (adapting step).

The elevation range of the wheel mounting portion 6 of the wheel mounting portion elevating means 8 is a predetermined range from below to above the temporary vehicle height reference position. While the wheel mounting portion 6 is elevated, the alignment measuring means 9 measures a change in the toe angle and a change in the camber angle of the wheel mounting portion 6 at a plurality of positions (first measurement step).

Figure 12A:
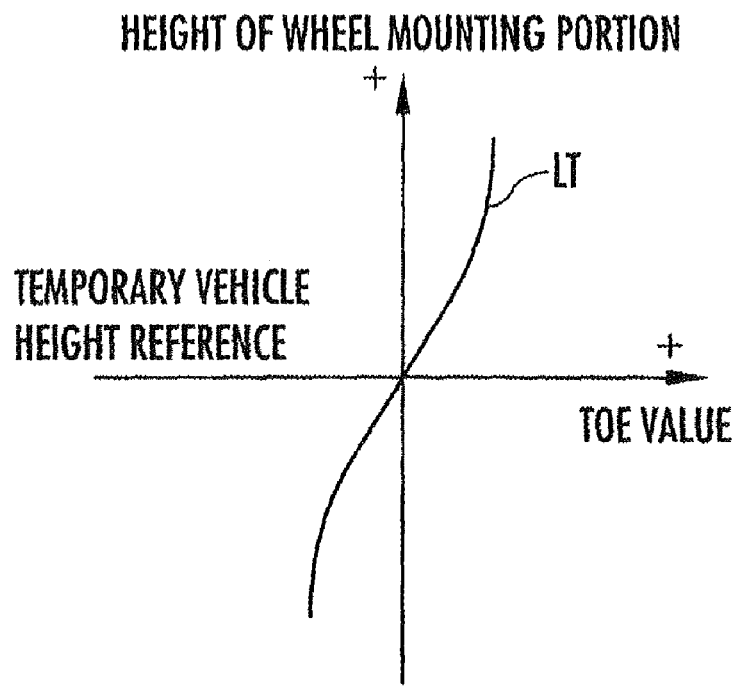
FIG. 12(a) is a graph illustrating a toe angle change curve obtained in a change curve forming step.
Figure 12B:
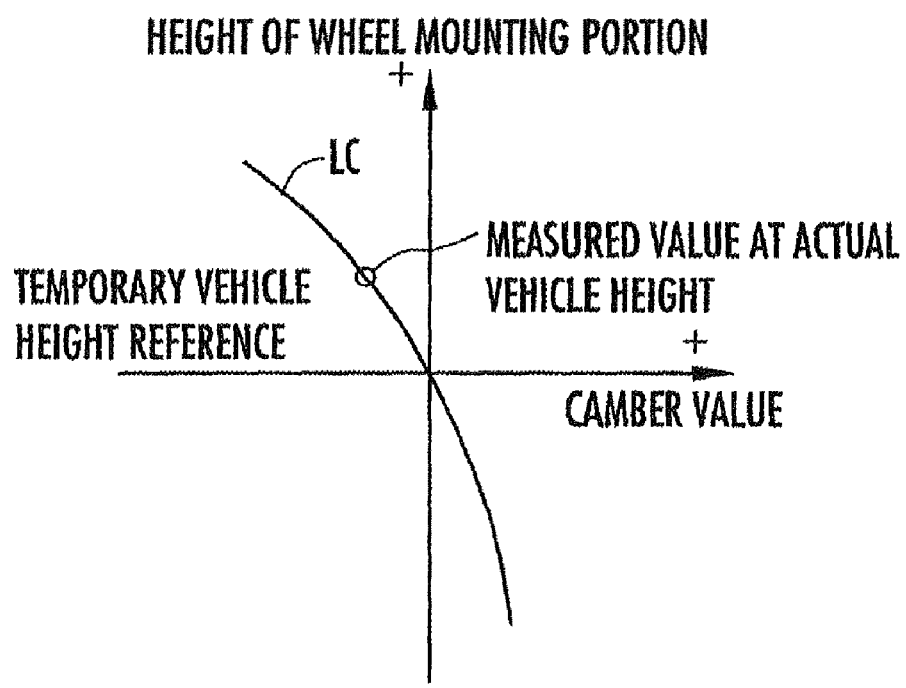
FIG. 12(b) is a graph illustrating a camber angle change curve obtained in the change curve forming step.

Further, the alignment measuring means 9 forms a toe angle change curve LT which represents a relationship between a change in the position and a change in the toe angle of the wheel mounting portion 6 based on the temporary vehicle height reference as shown in FIG. 12(*a*) and forms a camber angle change curve LC which represents a relationship between a change in the position and a change in the camber angle of the wheel mounting portion 6 based on the temporary vehicle height reference as shown in FIG. 12(*b*) (change curve forming step).

The toe angle change curve LT shown in FIG. 12(*a*) and the camber angle change curve LC shown in FIG. 12(*b*) obtained in the above are based on the temporary vehicle height reference, which is different from a reference obtained from an actual vehicle height. Therefore, subsequently, after releasing the clamping of the vehicle body 2 by the vehicle body support means 7, the wheel mounting portion elevating means 8 elevates the vehicle body 2 along with the wheel mounting portions 6 to detach the vehicle body 2 upward from the vehicle body support means 7. Then, the height position of the wheel mounting portion 6 in this state is set as an actual vehicle height reference (second reference setting step) and the alignment measuring means 9 measures the camber angle of the wheel mounting portion 6 in the height position (second measurement step).

Figure 13A:
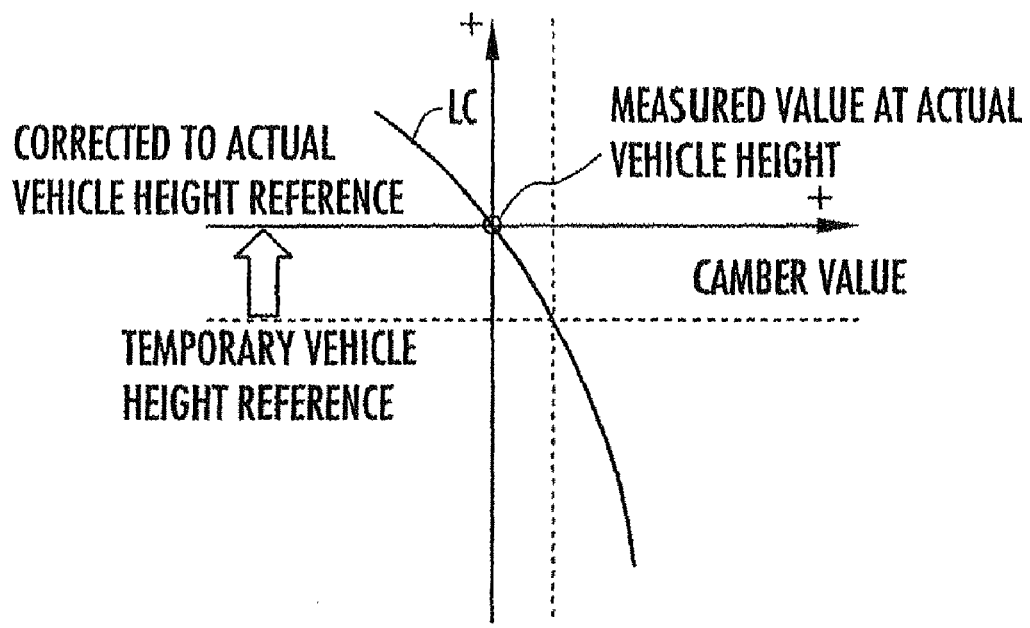
FIG. 13(a) is a graph illustrating a camber angle change curve whose reference is corrected in a reference correction step.
Figure 13B:
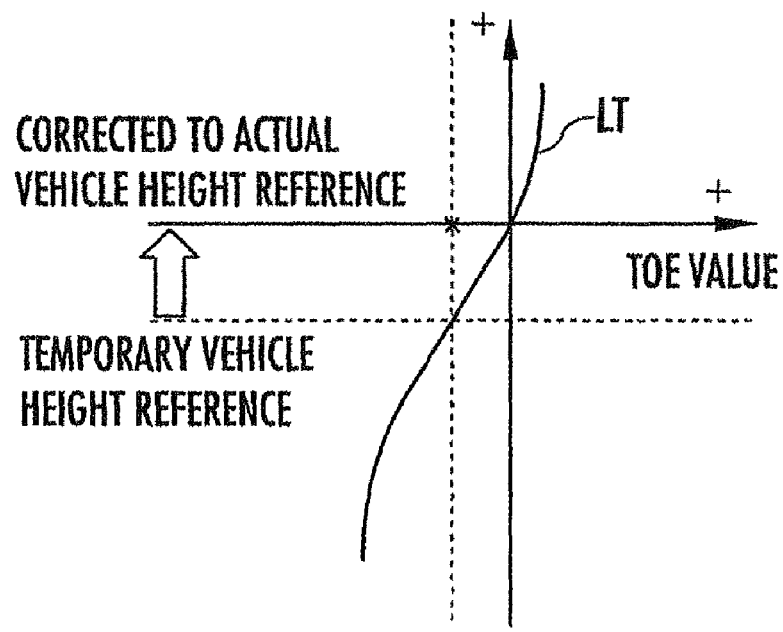
FIG. 13(b) is a graph illustrating a toe angle change curve whose reference is corrected in the reference correction step.

The above camber angle is measured with the vehicle weight imposed on the wheel mounting portion 6 via the suspension 4, and therefore the position of the wheel mounting portion 6 relative to the vehicle body 2 detected by the position detecting means is the same as in the finished vehicle. Thereafter, as shown in FIG. 13(*a*), the alignment measuring means 9 extracts the coordinates corresponding to the value of the camber angle measured in the above from the camber angle change curve LC and corrects the height position (namely, the actual vehicle height reference) of the wheel mounting portion 6 in the coordinates so as to coincide with the reference position (reference correction step). This allows the high accuracy camber angel change curve LC measured by the alignment measuring means 9.

Subsequently, as shown in FIG. 13(*b*), the alignment measuring means 9 corrects the reference of the toe angle change curve LT from the temporary vehicle height reference to the actual vehicle height reference (reference correction step). For the reference correction of the toe angle change curve LT, it is possible to use the height position (namely, the actual vehicle height reference) of the wheel mounting portion 6 used for the correction of the camber angle change curve LC. This allows the high accuracy toe angle change curve LT measured by the alignment measuring means 9.

the display means displays the camber angle change curve LC and the toe angle change curve LT obtained in this manner, thereby providing the worker with the highly accurate measurement result at the time of fixing the wheel alignment and enabling highly accurate wheel alignment fixing with the dynamic wheel alignment considered.

Moreover, the alignment measuring method of the present invention is able to detect offset and setback of the suspensions 4 previous to the alignment measurement in the following procedure.

As shown in FIG. 1, first, the vehicle body support means elevates the vehicle body 2 conveyed with being supported by the hangers 3 so as to detach from the hangers 3. Thereby, each wheel mounting portion 6 is located above each support plate 14 and the vehicle body 2 is placed on the placement sections 12 (vehicle body support step). In this instance, the mounting members 25 of the dummy wheels 10 are respectively mounted on the wheel mounting portions 6 in the upstream in advance (member mounting step). Subsequently, each wheel mounting portion elevating means 8 elevates the support plate 14, and the first frame 27 of the dummy wheel 10 on the support plate 14 is connected to the mounting member 25 (connection step). This causes the dummy wheel 10 to be mounted on the wheel mounting portion 6 on the support plate 14, which is the same condition as the wheel is mounted on the wheel mounting portion 6 though the wheel is not mounted actually. In this condition, as shown in FIG. 2, the sensor unit 49 is opposed to the wheel mounting portion 6 via the dummy wheel 10. The sensor unit 49 is retracted in a direction away from the wheel mounting portion 6 before the connecting means 26 of the dummy wheel 10 is connected to the mounting member 25. After the connecting means 26 of the dummy wheel 10 is connected to the mounting member 25, the sensor unit 49 advances toward the wheel mounting portion 6 and is opposed to the wheel mounting portion 6 in a noncontact state with a predetermined distance apart from the wheel mounting portion 6.

Subsequently, the wheel mounting portion elevating means 8 respectively elevate the wheel mounting portions 6 via the support plates 14 to detach the vehicle body 2 from the vehicle body support means 7. In this condition, the dummy wheels 10 are mounted on the wheel mounting portions 6 and therefore the vehicle weight is applied to the suspensions 4 and the wheel mounting portions 6 in the same condition as in the finished vehicle on which the wheels are mounted. Thereafter, in this condition, the sensors of the sensor unit 49 measure the toe angle and the camber angle.

On the other hand, when the first frame 27 is connected to the mounting member 25 of the wheel mounting portion 6 via the connecting means 26, the support plate 14 moves back and forth or left and right from the original position according to the connection to the mounting member 25 via the connecting means 26. The original position of each support plate 14 is preset relative to the first frame 27 and the second frame 28. Then, the wheel mounting portion elevating means 8 elevates the wheel mounting portion 6 via the support plate 14 to apply the vehicle weight to the wheel mounting portion 6, by which each wheel mounting portion 6 is placed in the same position as in the finished vehicle (same as the state where the wheels are actually mounted and put in contact with the ground). In this state, regarding the support plate 14, an encoder on the first movable plate 17 and an encoder on the lifting table 15 measure the distances of moving back and forth or left and right from the original position as the moving distances of the first frame 27 and the second frame 28 (moving distance measurement step), and the coordinates of each wheel mounting portion 6 are obtained from the position of each support plate 14. The coordinates of each wheel mounting portion 6 are obtained from the support plate 14 via the dummy wheel 10 integrally connected with the wheel mounting portion 6 and therefore very accurate in comparison with the coordinates obtained from the wheel (a tire and the side wall of a road wheel) as in the conventional cases.

Figure 14A:
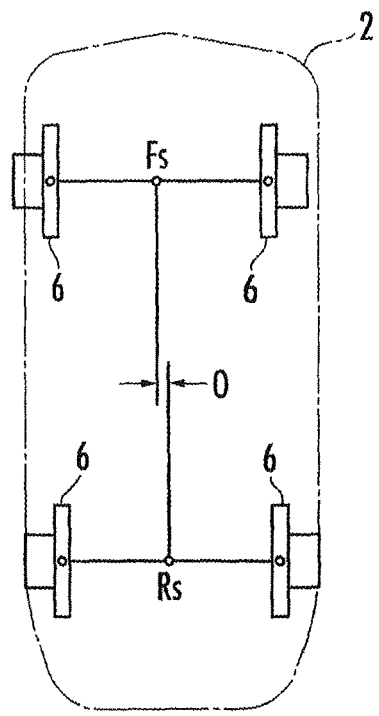
FIG. 14(a) is an explanatory diagram illustrating an offset detected in this embodiment.
Figure 14B:
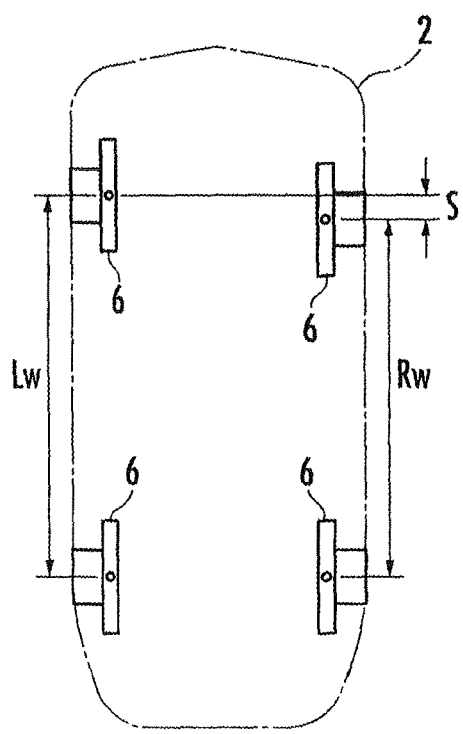
FIG. 14(b) is an explanatory diagram illustrating a setback detected in this embodiment.

Further, the arithmetic processing is performed by the computer on the basis of the coordinates of each wheel mounting portion 6 obtained as described above to detect offset O which is a displacement amount between the middle position $F_s$ between the front suspensions and the middle position $R_s$ between the rear suspensions as shown in FIG. 14(*a*) and to detect setback S which is a difference between the left and right wheel bases $L_w$ and $R_w$ as shown in FIG. 14(*b*) (offset and setback detecting step). While various calculation methods are conceivable for detecting the offset O and the setback S, for example, it is possible to calculate the setback S from a tilt of a straight line between the coordinates of the two front wheel mounting portions 6 with reference to a straight line between the coordinates of the two rear wheel mounting portions 6 of the vehicle body 2 and to calculate the offset O from a tilt of a straight line between the coordinates of the center between the two rear wheel mounting portions 6 and the coordinates of the center between the two front wheel mounting portions 6. Moreover, with reference to the straight line between the coordinates of the center between the two rear wheel mounting portions 6 and the coordinates of the center between the two front wheel mounting portions 6, it is possible to calculate the offset O on the basis of a tilt of the straight line between the coordinates of the two front wheel mounting portions 6 and a tilt of the straight line between the coordinates of the two rear wheel mounting portions 6.

Further, in this instance, the dummy wheels 10 are connected to the wheel mounting portions 6, which thereby produces a state where the wheels are mounted on the wheel mounting portions 6 with high accuracy. Therefore, it is possible to obtain the coordinates of each wheel mounting portion 6 with high accuracy and to detect the offset 0 and the setback S with high accuracy. Thereafter, it is possible to rapidly feedback the offset and setback detection results obtained in the above to a suspension installation station, which is not shown, in the assembly line.

Moreover, the wheel alignment measuring apparatus 1 according to this embodiment is activated by power supply from the sensor unit 49 of the alignment measuring means 9 and the sensor unit 49 includes three laser sensors (the first sensor 63, the second sensor 64, and the third sensor 65) as displacement amount detecting means. Each laser sensor is able to detect a displacement amount with high accuracy when the temperature of the laser sensor reaches a predetermined temperature along with the power supply, though the detected value is not stable from immediately after the start of power supply until the temperature reaches the predetermined temperature and maintains the temperature substantially constant at the predetermined level. That is caused by a displacement in the position of a laser radiation lens due to thermal expansion or the like caused by a temperature change of the laser sensor.

Therefore, immediately after the activation of the laser sensor, a detected value changes according to a temperature rise of the laser sensor due to the power supply even in the case of no occurrence of displacement of the wheel Therefore, in the present invention, it is preferable to correct a value detected by the laser sensor as described below.

Figure 15:
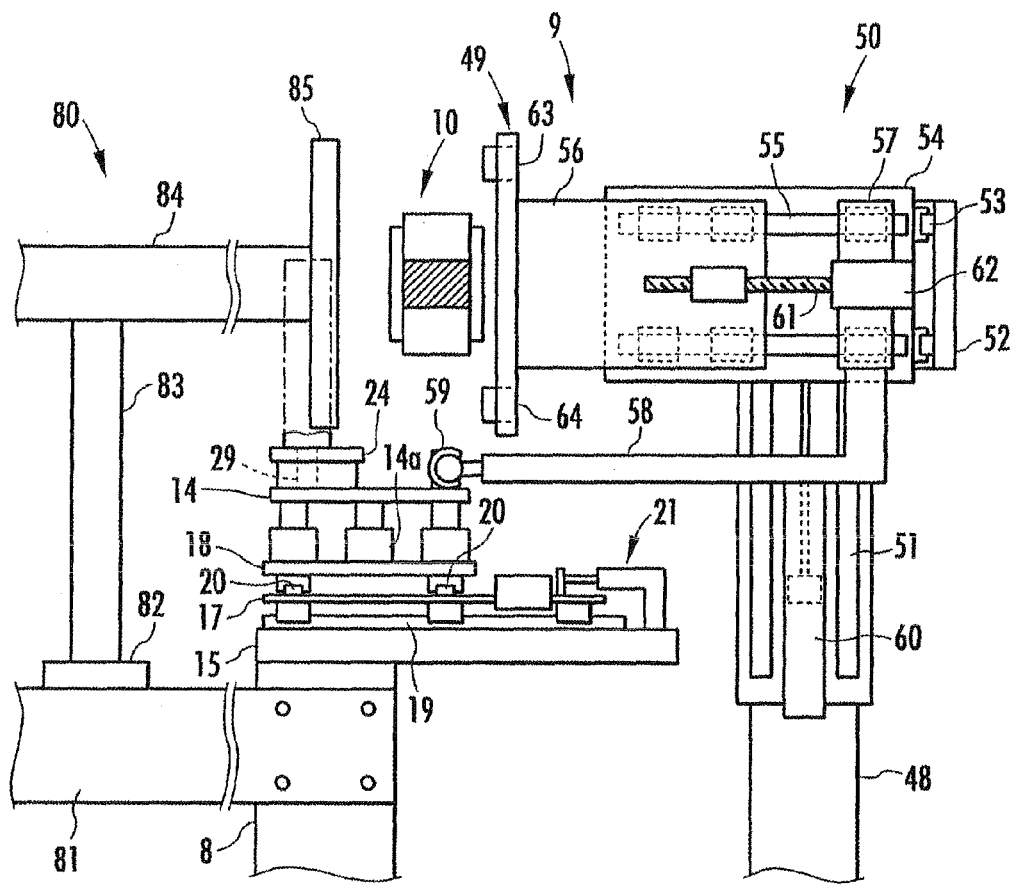
FIG. 15 is an explanatory diagram illustrating the holding state of a calibration masterwork in the wheel alignment measuring apparatus.

Specifically, previous to turning on the sensor unit 49, a calibration masterwork 80 is mounted on the wheel mounting portion elevating means 8 as shown in FIG. 15, first, instead of the actually measured vehicle body 2 (including the wheel mounting portion 6).

Figure 16:
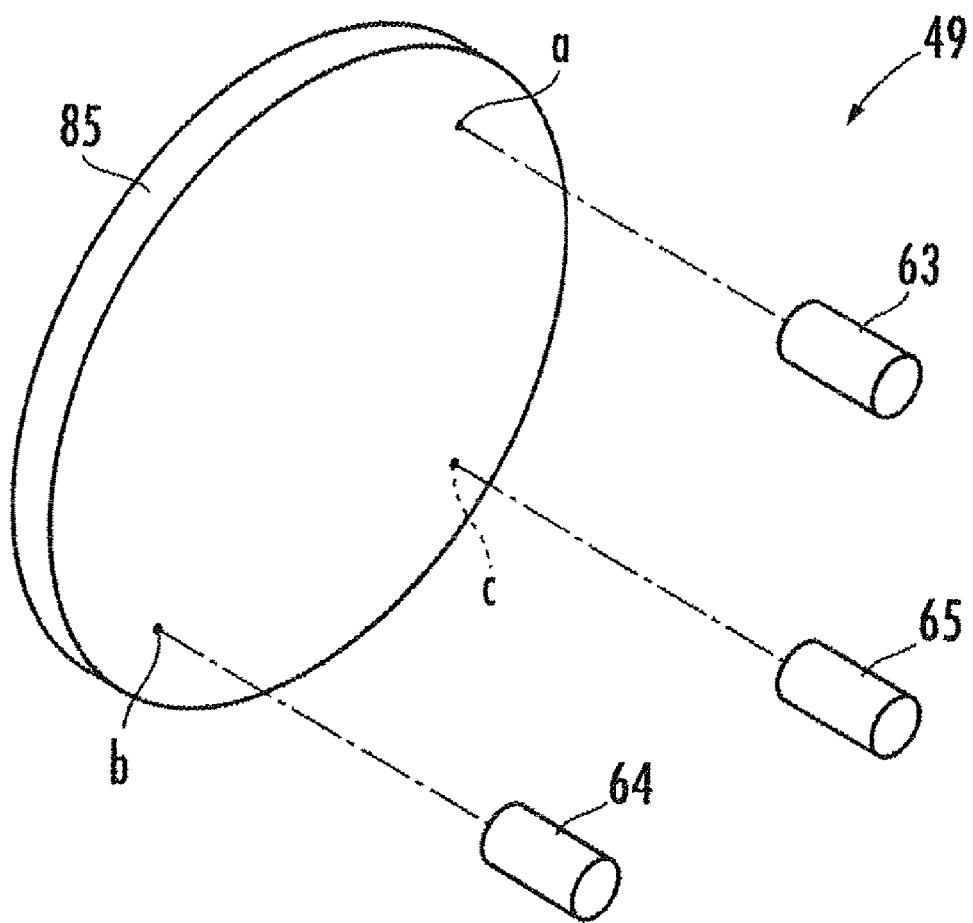
FIG. 16 is an explanatory diagram illustrating a positional relationship between a wheel mounting portion reproducing member and the three sensors.

The calibration masterwork 80 includes a masterwork support member 81, and the masterwork support member 81 is secured to each wheel mounting portion elevating means 8 attachably and detachably, for example, with a bolt in such a way as to connect the wheel mounting portion elevating means 8 arranged in the left side and the right side to each other. The masterwork support members 81 are provided on the front side and the rear side, respectively, with the front and rear masterwork support members 81 connected via a connecting member 82. A rotating shaft 83 is erected at both ends of the connecting member 82. At the upper end of the rotating shaft 83, a fixed shaft member 84 is mounted rotatably around the rotating shaft 83. At both ends of the fixed shaft member 84, a wheel mounting portion reproducing member 85 is mounted so as to be opposed to the sensors 63, 64, and 65. The wheel mounting portion reproducing member 85 is adjusted so as to face the sensors 63, 64, and 65 as shown in FIG. 16 by rotating the fixed shaft member 84.

Figure 17:
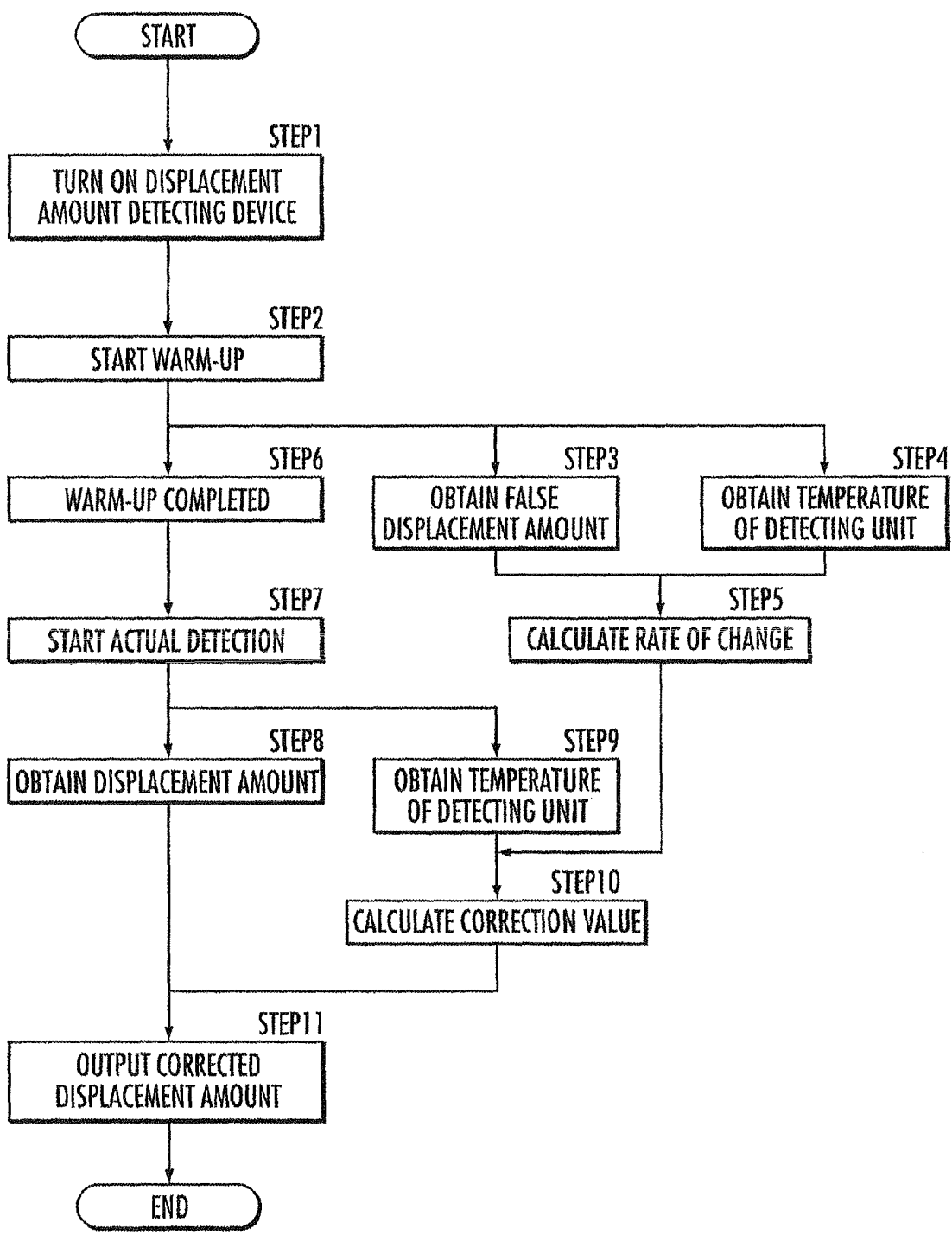
FIG. 17 is a flowchart of a displacement amount detecting method in this embodiment.

Subsequently, referring to FIG. 17, the sensor unit 49 is turned on in an unheated state in step 1 to start warm-up in step 2 (measuring means warm-up step).

Figure 18A:
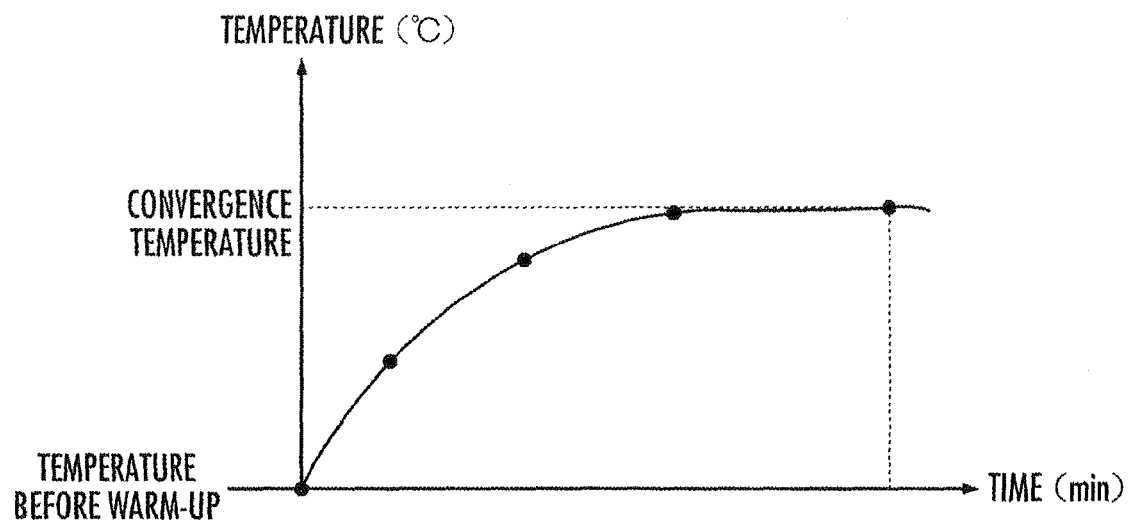
FIG. 18(a) is a graph illustrating a variation with time of a temperature of the alignment measuring means from the start of warm-up in a measuring means warm-up step.
Figure 18B:
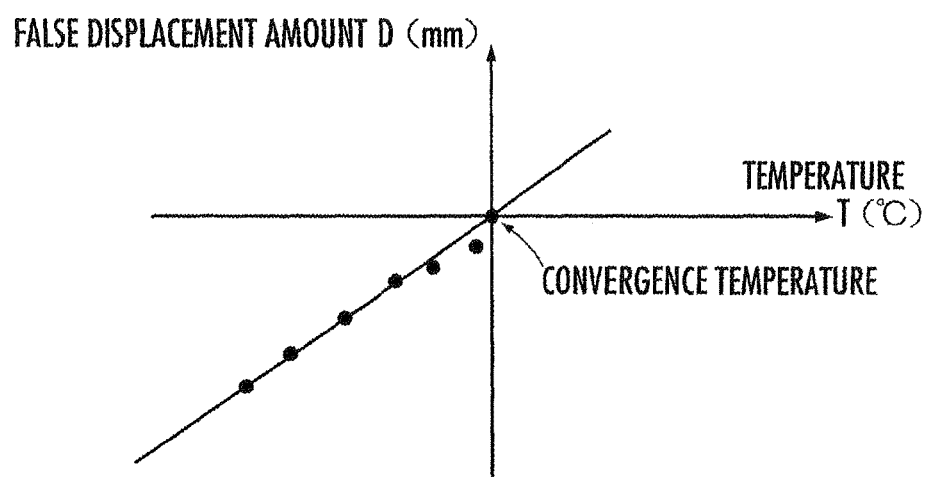
FIG. 18(b) is a graph illustrating a rate of change of a first displacement amount.

Subsequently, the sensor unit 49 obtains a first displacement amount (D) of a distance between each of the sensors 63, 64, and 65 of the sensor unit 49 and the wheel mounting portion reproducing member 85 (step 3) and obtains the temperature (T) of each of the sensors 63, 64, and 65 at that time by means of the temperature detecting means (step 4). The first displacement amount (D) in this instance is a false displacement amount obtained in such a way as if the wheel mounting portion reproducing member 85 were displaced along with the temperature rise, and the first displacement amount (D) and the temperatures (T) of the sensors 63, 64, and 65 vary as shown in FIG. 18(*a*) after the start of the warm-up. The first displacement amount (D) and the temperatures (T) of the sensors 63, 64, and 65 are obtained at least five times and more preferably 10 times or more as shown in FIG. 18(*b*), for example, until the rate of change of temperature in the sensors 63, 64, and 65 reaches 0.2° C./10 min and the convergence temperature. The first displacement amount (D) and the temperatures (T) obtained multiple times are stored in the storage means every time the values are obtained.

Subsequently, the rate-of-change calculating means calculates a rate of change of the first displacement amount (D) associated with a temperature change in the sensors 63, 64, and 65 by using the following equation (1) from the plurality of stored first displacement amounts (D) and temperatures (T) (step 5).

[Eq. 1]

$$\text{Rate of change} = \frac{n\left(\sum TD\right) - \left(\sum T \sum D\right)}{n\left(\sum T^2\right) - \left(\sum T\right)^2} \qquad (1)$$

After the calculation of the rate of change of the first displacement amount and the warm-up of the sensor unit 49 (step 6), the calibration masterwork 80 is removed. It is necessary to calculate the rate of change of the first displacement amount using the calibration masterwork 80 only on the order of every six months.

Thereafter, as described above, the vehicle body 2 conveyed by the hangers 3 is transferred to the wheel alignment measuring apparatus 1 and then the wheel mounting portion elevating means 8 elevate the wheel mounting portions 6 via the support plates 14. Then, the sensors 63, 64, and 65 of the sensor unit 49 start to detect the second displacement amount, which is an actual displacement amount, at the measurement points (a, b, and c) set on the disk surface of each wheel mounting portion 6 exposed from the dummy wheel 10 (step 7).

Subsequently, the alignment measuring means 9 obtains the second displacement amount ($D_1$) at the measurement points (a, b, and c) of the wheel mounting portion 6 started to be elevated by the wheel mounting portion elevating means 8 (step 8). At the same time, the temperature detecting means obtains the temperatures ($T_1$) of the sensors 63, 64, and 65 at the time of detection of the second displacement amount ($D_1$) (step 9).

Thereafter, a corrected displacement amount is calculated and output for a correction to a displacement amount detected at a predetermined reference temperature ($T_0$) from the rate of change obtained in step 5, the second displacement amount ($D_1$) obtained in step 8, and the temperatures ($T_1$) obtained in step 9. More specifically, the corrected displacement amount calculating means calculates a correction value from the predetermined reference temperature ($T_0$), the obtained temperatures ($T_1$) of the sensors 63, 64, and 65, and the calculated rate of change by using the following equation (2) (step 10).

[Eq. 2]

$$\text{Correction value} = (T_1 - T_0) \times \text{Rate of change} \quad (2)$$

Further, the corrected displacement amount calculating means outputs a corrected displacement amount ($D_\alpha$) from the second displacement amount ($D_1$) and the calculated correction value by using the following equation (3) (step 11).

[Eq. 3]

$$D_\alpha = D_1 - \text{Correction value} \quad (3)$$

Thereafter, the position of the wheel mounting portion 6 is determined based on the corrected displacement amount ($D_\alpha$). This enables high accuracy alignment measurement by eliminating the effect of the temperatures in the sensors 63, 64, and 65 of the sensor unit 49.

What is claimed is:

1. A vehicle wheel alignment measuring method comprising:
   a vehicle body support step of causing a vehicle body support means to support a vehicle body with wheel mounting portions free to move up and down, each of the wheel mounting portions being provided on an axle including a vehicle suspension;
   a wheel mounting portion elevating step of elevating the wheel mounting portion without a wheel mounted thereon; and
   a measurement step of measuring wheel alignment based on the position and attitude at predetermined measurement points preset on the wheel mounting portion elevated in the wheel mounting portion elevating step, wherein:
   the wheel mounting portion elevating step is preceded by a dummy wheel attachment step of mounting a dummy wheel on the wheel mounting portion to simulate a situation where a wheel is mounted on the wheel mounting portion with the measurement points on the wheel mounting portion exposed; and
   the wheel mounting portion elevating step includes elevating the wheel mounting portion via the dummy wheel and the measurement step includes performing the measurement at the measurement points exposed from the dummy wheel.

2. The vehicle wheel alignment measuring method according to claim 1, wherein:
   the wheel mounting portion elevating step includes detaching the vehicle body from the vehicle body support means via the dummy wheels; and
   the measurement step includes a static alignment measurement step of measuring wheel alignment in a stationary state with a vehicle weight received by the dummy wheels.

3. The vehicle wheel alignment measuring method according to claim 1, wherein:

the vehicle body support step includes causing the vehicle body support means to support the vehicle body so as to disable elevation thereof;
the wheel mounting portion elevating step includes a load measurement step of measuring a load of the wheel mounting portion while elevating the wheel mounting portion relatively to the vehicle body via the dummy wheel and an elevation stop step of stopping the elevation of the wheel mounting portion at the timing that the load of the wheel mounting portion measured in the load measurement step coincides with a preset load; and
the measurement step includes a static alignment measurement step of measuring wheel alignment in a stationary state with the vehicle weight received by the dummy wheel after the stop of the elevation in the elevation stop step.

4. The vehicle wheel alignment measuring method according to claim 1, wherein:
   the vehicle body support step includes causing the vehicle body support means to support the vehicle body so as to disable elevation thereof;
   the wheel mounting portion elevating step includes elevating the wheel mounting portion relatively to the vehicle body via the dummy wheel; and
   the measurement step includes a dynamic alignment measurement step of measuring wheel alignment in the midst of elevating the wheel mounting portion relatively to the vehicle body via the dummy wheel in the wheel mounting portion elevating step.

5. The vehicle wheel alignment measuring method according to claim 1, wherein:
   the wheel mounting portion has a brake disk installed on a hub to which the wheel is to be connected;
   the dummy wheel is connected to the hub of the wheel mounting portion to expose a plurality of points on a disk surface of the brake disk as the measurement points; and
   the measurement step includes performing the measurement via the disk surface of the brake disk exposed from the dummy wheel.

6. The vehicle wheel alignment measuring method according to claim 1, wherein:
   the vehicle body support step includes causing the vehicle body support means to support the vehicle body so as to disable elevation thereof;
   the wheel mounting portion elevating step includes a first reference setting step of setting a predetermined position in a range where the wheel mounting portion is able to move up and down as a temporary vehicle height reference for the vehicle body supported in the vehicle body support step to elevate the wheel mounting portion over a predetermined range from below to above the temporary vehicle height reference; and
   the measurement step includes: a first measurement step of measuring a change in a toe angle and a change in a camber angle of the wheel mounting portion over the elevation range of the wheel mounting portion in the wheel mounting portion elevating step; a change curve forming step of forming a toe angle change curve which represents a relationship between a change in the position and a change in the toe angle of the wheel mounting portion based on the temporary vehicle height reference set in the first reference setting step and forming a camber angle change curve which represents a relationship between a change in the position and a change in the camber angle of the wheel mounting portion based on the temporary vehicle height reference on the basis of the measurement result of the first measurement step; a second reference setting step of releasing the rigid support of the vehicle body by the vehicle body support means to make the vehicle body supported by the wheel mounting portion after the change curve forming step and setting the height position of the wheel mounting portion relative to the vehicle body in the state as an actual vehicle height reference; a second measurement step of measuring the camber angle of the wheel mounting portion located in the actual vehicle height reference; and a reference correction step of correcting the reference in the camber angle change curve from the temporary vehicle height reference to the actual vehicle height reference on the basis of the height position of the wheel mounting portion corresponding to the camber angle measured in the second measurement step and correcting the reference in the toe angle change curve from the temporary vehicle height reference to the actual vehicle height reference on the basis of the height position of the wheel mounting portion corresponding to the camber angle measured in the second measurement step.

7. The vehicle wheel alignment measuring method according to claim 6, wherein the wheel mounting portion elevating step and the first measurement step are performed in an adapting step for achieving a smooth operation of the suspension provided in an assembly line for assembling the vehicle body.

8. The vehicle wheel alignment measuring method according to claim 1, wherein:
the dummy wheel includes a mounting member to be mounted on an axle end on the wheel mounting portion and a connection frame to be attachably and detachably connected to the mounting member; and
the dummy wheel attachment step includes: a member mounting step of mounting the mounting member on each axle end of four wheel mounting portions; a connection step of locating the respective wheel mounting portions with the mounting members mounted thereon above support plates provided movably in an anteroposterior direction and in a left-right direction, assuming that a vehicle length direction is the anteroposterior direction and a vehicle width direction is the left-right direction, and connecting the connection frame connectable to the mounting member provided on each support plate to the mounting member mounted on each wheel mounting portion; a moving distance measurement step of measuring a moving distance of each connection frame in the anteroposterior direction and in the left-right direction from a preset reference position for each connection frame via the support plate after each connection frame is connected to the mounting member in the connection step; and an offset and setback detecting step of detecting an offset, which is an amount of displacement in the middle position between the front and rear suspensions, and a setback, which is a left-and-right wheel base difference, from the coordinates of each wheel mounting portion based on the moving distance of each connection frame measured in the moving distance measurement step.

9. The vehicle wheel alignment measuring method according to claim 1, wherein:
the measurement step is performed by using a measuring means having a displacement amount detecting means, which is enabled to detect a displacement amount at the measurement points of the wheel mounting portion by power supply, and a temperature detecting means, which detects a temperature of the displacement amount detecting means, and the measurement step includes a measuring means warm-up step of performing warm-up previous to performing alignment measurement of the wheel mounting portion from immediately after the start of the power supply to the measuring means until the temperature of the displacement amount detecting means reaches a predetermined temperature;
the measuring means warm-up step includes the steps of: securing a wheel mounting portion reproducing member in a fixed position, instead of the wheel mounting portion; obtaining a first displacement amount which is a false displacement amount detected multiple times by the displacement amount detecting means due to an effect of a temperature change for the wheel mounting portion reproducing member and a temperature detected by a temperature detecting means at the time of detecting each first displacement amount; and calculating a rate of change of the first displacement amount associated with the temperature change from each first displacement amount and temperature; and
the measurement step includes the step of: calculating a correction value on the basis of the rate of change of the first displacement amount and the temperature detected by the temperature detecting means at the time of detecting a second displacement amount in the case of detecting the second displacement amount for the wheel mounting portion by the displacement amount detecting means by performing the alignment measurement of the wheel mounting portion and further outputting the displacement amount, which is corrected by subtracting the correction value from the second displacement amount, as a correct displacement amount.

10. An apparatus for measuring wheel alignment of a vehicle, comprising:
a vehicle body support means which supports a vehicle body so as to enable elevation or to disable elevation with wheel mounting portions free to move up and down, each of the wheel mounting portions being provided on an axle of the vehicle;
a dummy wheel which is attachably and detachably mounted on the wheel mounting portion with exposed predetermined measurement points previously set on the wheel mounting portion without a wheel mounted thereon to simulate a situation where the wheel is mounted on the wheel mounting portion;
a wheel mounting portion elevating means which elevates the wheel mounting portion via the dummy wheel; and
a measuring means which measures the wheel alignment on the basis of the position and attitude at the measurement points on the wheel mounting portion elevated by the wheel mounting portion elevating means.

11. The vehicle wheel alignment measuring apparatus according to claim 10, wherein:
the dummy wheel includes a mounting member to be mounted on an axle end on the wheel mounting portion, a connection frame to be attachably and detachably connected to the mounting member, and a connecting means which is provided in the connection frame to connect the connection frame to the mounting member; and
the connection frame includes an open portion which exposes the measurement points on the wheel mounting portion in the state where the connection frame is connected to the mounting member mounted on the wheel mounting portion and a ground contact portion provided a predetermined distance apart from and below the wheel mounting portion.

12. The vehicle wheel alignment measuring apparatus according to claim 11, wherein:

the mounting member includes a connecting shaft which extends coaxially with the wheel mounting portion and a connection hole which is formed in the connecting shaft and has a diameter gradually increasing toward the front end of the connecting shaft; and the connecting means includes a tapered shaft insertable into the connection hole and a holding mechanism which releasably holds the state where the tapered shaft is inserted into the connection hole.

13. The vehicle wheel alignment measuring apparatus according to claim 11, wherein:

a brake disk is installed on a hub to which the wheel is to be connected in the wheel mounting portion;

the mounting member of the dummy wheel is connected to the hub of the wheel mounting portion; and the open portion of the dummy wheel exposes a plurality of points on a disk surface of the brake disk as the measurement points.

14. The vehicle wheel alignment measuring apparatus according to claim 10, wherein the wheel mounting portion elevating means includes a load measuring means which measures a load of the wheel mounting portion in process of elevation via the dummy wheel.

15. The vehicle wheel alignment measuring apparatus according to claim 4, further comprising an elevation control means which stops the elevation of the wheel mounting portion at the time of coincidence between the load measured by the load measuring means and a preset load, wherein the measuring means measures the wheel alignment of the wheel mounting portion whose elevation is stopped by the elevation control means.

16. The vehicle wheel alignment measuring apparatus according to claim 10, wherein:

the wheel mounting portion elevating means includes a support plate (holding means) which supports the dummy wheel from below; and the measuring means (attitude angle measuring means) includes a sensor unit which is opposed to the measurement points on the wheel mounting portion in a noncontact state, a connecting member which connects the sensor unit to the support plate via a ball joint, and a follower operating means which causes the sensor unit to follow an up and down motion of the support plate performed by the wheel mounting portion elevating means via the connecting member with the sensor unit supported so as to be free to move up and down.

17. The vehicle wheel alignment measuring apparatus according to claim 10, wherein:

the wheel mounting portion elevating means includes a support plate which is provided movably in an anteroposterior direction and in a left-right direction to support the dummy wheel from below, assuming that a vehicle length direction is the anteroposterior direction and a vehicle width direction is the left-right direction; and the dummy wheel includes a mounting member to be mounted on an axle end on the wheel mounting portion and a connection frame to be attachably and detachably connected to the mounting member, the apparatus, further comprising:

a moving distance measuring means which measures a moving distance of each connection frame in the anteroposterior direction and in the left-right direction from a reference position previously set for each connection frame via the support plate after four connection frames are connected to mounting members mounted on four wheel mounting portions; and an offset and setback detecting means which detects an offset, which is an amount of displacement in the middle position between the front and rear suspensions, and a setback, which is a left-and-right wheel base difference, from the coordinates of each wheel mounting portion based on the moving distance of each connection frame measured by the moving distance measuring means.

18. The vehicle wheel alignment measuring apparatus according to claim 10, wherein the measuring means includes a displacement amount detecting means, which is activated by power supply to detect a displacement amount at the measurement points on the wheel mounting portion, and a temperature detecting means, which detects a temperature of the displacement amount detecting means, and performs warm-up previous to performing alignment measurement of the wheel mounting portion from immediately after the start of the power supply to the measuring means until the temperature of the displacement amount detecting means reaches a predetermined temperature;

the apparatus further comprising:

a storage means which stores a first displacement amount which is a false displacement amount detected multiple times by the displacement amount detecting means due to an effect of a temperature change for a wheel mounting portion reproducing member secured in a fixed position, instead of the wheel mounting portion, and a temperature detected by a temperature detecting means at the time of detecting each first displacement amount during the warm-up of the measuring means;

a rate-of-change calculating means which calculates a rate of change of the first displacement amount associated with the temperature change from each first displacement amount and temperature stored in the storage means during the warm-up; and a corrected displacement amount calculating means which calculates a correction value on the basis of the rate of change calculated by the rate-of-change calculating means and the temperature detected by the temperature detecting means at the time of detecting a second displacement amount, in the case of detecting the second displacement amount for the wheel mounting portion by the displacement amount detecting means by performing the alignment measurement of the wheel mounting portion after the completion of the warm-up, and outputs the displacement amount, which is corrected by subtracting the correction value from the second displacement amount, as a correct displacement amount.

19. The vehicle wheel alignment measuring apparatus according to claim 18, wherein the displacement amount detecting means is a laser sensor which detects the displacement amount by means of a laser beam reflected at the measurement points by irradiating the measurement points on the wheel mounting portion with the laser beam.

* * * * *